US007096160B2

(12) United States Patent
Skidmore et al.

(10) Patent No.: US 7,096,160 B2
(45) **Date of Patent: *Aug. 22, 2006**

(54) SYSTEM AND METHOD FOR MEASURING AND MONITORING WIRELESS NETWORK PERFORMANCE IN CAMPUS AND INDOOR ENVIRONMENTS

(75) Inventors: Roger R. Skidmore, Blacksburg, VA (US); Theodore S. Rappaport, Blacksburg, VA (US)

(73) Assignee: Wireless Valley Communications, Inc., Austin, TX (US)

( * ) Notice: Subject to any disclaimer, the term of this patent is extended or adjusted under 35 U.S.C. 154(b) by 505 days.

This patent is subject to a terminal disclaimer.

(21) Appl. No.: 10/287,026

(22) Filed: Nov. 4, 2002

(65) Prior Publication Data

US 2003/0055604 A1 Mar. 20, 2003

Related U.S. Application Data

(63) Continuation of application No. 09/221,985, filed on Dec. 29, 1998, now Pat. No. 6,442,507.

(51) Int. Cl.
*G06F 11/30* (2006.01)
*G06F 15/00* (2006.01)

(52) U.S. Cl. ...................................................... 702/186

(58) Field of Classification Search ................. 702/186, 702/150, 152, 182; 455/446, 456.1

See application file for complete search history.

(56) References Cited

U.S. PATENT DOCUMENTS 4,675,147 A 6/1987 Schaefer et al.
4,736,453 A 4/1988 Schloemer (Continued)

OTHER PUBLICATIONS

Kobleus et al.. Mar. 1, 1998, Optimizing In–Building Coverage pp. 1–4.
Meyers, Jason, Jan. 26. 1998, From the inside out: Vewndor guides camiers toward indoor coverage.
Gray Somerville and Todd Baylor, Apr., 1996, Intertec, vol. 13, pp. 98+.

(Continued)

*Primary Examiner*—John Barlow
*Assistant Examiner*—Demetrius Pretlow
(74) *Attorney, Agent, or Firm*—Whitham, Curtis & Christofferson, P.C.

(57) ABSTRACT

A system and method for measuring and monitoring wireless network performance in campus and indoor environments provides for embedding measured network and signal properties at one or more locations within a facility into a site specific computer model which represents the facility. The computer representation is preferably three dimensional. The system and method allows for automatic, periodic, or location specific taking of measurements, and automatic or periodic embedding of measured data. The system and method allows real time or non-real time measurement and storing of performance data, and the invention is useful for test, measurement, verification, and in-situ or remote monitoring for on-going validation and maintenance of wireless networks.

803 Claims, 6 Drawing Sheets

15 14 12 11 10 18

U.S. PATENT DOCUMENTS

| | | | |
|---|---|---|---|
| 4,885,694 | A | 12/1989 | Pray et al. |
| 5,111,392 | A | 5/1992 | Malin |
| 5,119,307 | A | 6/1992 | Blaha et al. |
| 5,239,487 | A | 8/1993 | Horejsi et al. |
| 5,293,640 | A | 3/1994 | Gunmar et al. |
| 5,307,261 | A | 4/1994 | Maki et al. |
| 5,337,149 | A | 8/1994 | Kozah et al. |
| 5,339,184 | A | 8/1994 | Tang |
| 5,375,123 | A | 12/1994 | Andersson et al. |
| 5,394,522 | A | 2/1995 | Sanchez-Frank et al. |
| 5,450,615 | A | 9/1995 | Fortune et al. |
| 5,458,123 | A | 10/1995 | Unger et al. |
| 5,465,390 | A | 11/1995 | Cohen |
| 5,467,441 | A | 11/1995 | Stone et al. |
| 5,482,050 | A | 1/1996 | Smokoff et al. |
| 5,485,568 | A | 1/1996 | Venable et al. |
| 5,491,644 | A | 2/1996 | Pickering et al. |
| 5,491,837 | A | 2/1996 | Haartsen |
| 5,493,679 | A | 2/1996 | Virgil et al. |
| 5,515,269 | A | 5/1996 | Willis et al. |
| 5,528,518 | A | 6/1996 | Bradshaw et al. |
| 5,539,665 | A | 7/1996 | Lamming et al. |
| 5,553,312 | A | 9/1996 | Gattey et al. |
| 5,553,620 | A | 9/1996 | Snider et al. |
| 5,555,354 | A | 9/1996 | Strasnick et al. |
| 5,561,841 | A | 10/1996 | Markus |
| 5,564,070 | A | 10/1996 | Want et al. |
| 5,586,254 | A | 12/1996 | Kondo |
| 5,594,946 | A | 1/1997 | Menich et al. |
| 5,598,532 | A | 1/1997 | Liron |
| 5,625,827 | A | 4/1997 | Krause et al. |
| 5,636,344 | A | 6/1997 | Lewis |
| 5,689,355 | A | 11/1997 | Okubo et al. |
| 5,710,758 | A | 1/1998 | Soliman et al. |
| 5,755,072 | A | 5/1998 | Lingafelter |
| 5,761,093 | A | 6/1998 | Urbish et al. |
| 5,774,669 | A | 6/1998 | George et al. |
| 5,794,128 | A | 8/1998 | Brockel et al. |
| 5,799,154 | A | 8/1998 | Kuriyan |
| 5,802,146 | A | 9/1998 | Dulman |
| 5,809,282 | A | 9/1998 | Cooper et al. |
| 5,815,395 | A | 9/1998 | Hart et al. |
| 5,821,937 | A | 10/1998 | Tonelli et al. |
| 5,825,759 | A | 10/1998 | Liu |
| 5,828,960 | A | 10/1998 | Tang et al. |
| 5,831,610 | A | 11/1998 | Tonelli et al. |
| 5,832,389 | A | 11/1998 | Dent |
| 5,845,124 | A | 12/1998 | Berman |
| 5,861,887 | A | 1/1999 | Butler et al. |
| 5,867,112 | A | 2/1999 | Kost |
| 5,877,777 | A | 3/1999 | Colwell |
| 5,878,328 | A | 3/1999 | Chawla et al. |
| 5,907,850 | A | 5/1999 | Krause et al. |
| 5,917,808 | A | 6/1999 | Kosbab |
| 5,923,850 | A | 7/1999 | Barroux |
| 5,926,762 | A | 7/1999 | Arpee et al. |
| 5,940,196 | A | 8/1999 | Piehler et al. |
| 5,945,976 | A | 8/1999 | Iwamura et al. |
| 5,948,055 | A | 9/1999 | Pulsipher et al. |
| 5,949,335 | A | 9/1999 | Maynard |
| 5,949,988 | A | 9/1999 | Feisullin et al. |
| 5,953,669 | A | 9/1999 | Stratis et al. |
| 5,963,867 | A | 10/1999 | Reynolds et al. |
| 5,970,406 | A | 10/1999 | Komara |
| 5,977,851 | A | 11/1999 | Stancil et al. |
| 5,987,328 | A | 11/1999 | Ephremides et al. |
| 5,994,984 | A | 11/1999 | Stancil et al. |
| 6,006,021 | A | 12/1999 | Tognazzini |
| 6,018,625 | A | 1/2000 | Hayball et al. |
| 6,021,316 | A | 2/2000 | Heiska et al. |
| 6,032,105 | A | 2/2000 | Lee et al. |
| 6,038,547 | A | 3/2000 | Casto |
| 6,044,273 | A | 3/2000 | Tekinay |
| 6,058,102 | A | 5/2000 | Drysdale et al. |
| 6,058,262 | A | 5/2000 | Kawas et al. |
| 6,059,842 | A | 5/2000 | Dumarot et al. |
| 6,061,722 | A | 5/2000 | Lipa et al. |
| 6,075,541 | A | 6/2000 | Maclinovsky |
| 6,085,335 | A | 7/2000 | Djoko et al. |
| 6,088,522 | A | 7/2000 | Lee et al. |
| 6,104,699 | A | 8/2000 | Holender et al. |
| 6,108,309 | A | 8/2000 | Cohoe et al. |
| 6,111,857 | A | 8/2000 | Soliman et al. |
| 6,122,083 | A | 9/2000 | Ohta et al. |
| 6,148,010 | A | 11/2000 | Sutton et al. |
| 6,199,032 | B1 | 3/2001 | Anderson |
| 6,204,813 | B1 | 3/2001 | Wadell et al. |
| 6,208,833 | B1 | 3/2001 | Preschutti et al. |
| 6,229,540 | B1 | 5/2001 | Tonelli et al. |
| 6,243,772 | B1 | 6/2001 | Ghori et al. |
| 6,253,086 | B1 | 6/2001 | Parantainen et al. |
| 6,285,377 | B1 | 9/2001 | Greenbaum et al. |
| 6,289,203 | B1 | 9/2001 | Smith et al. |
| 6,311,144 | B1 | 10/2001 | Abu El Ata |
| 6,317,599 | B1 | 11/2001 | Rappaport et al. |
| 6,326,987 | B1 | 12/2001 | Alexander |
| 6,330,005 | B1 | 12/2001 | Tonelli et al. |
| 6,337,688 | B1 | 1/2002 | Berstis |
| 6,338,031 | B1 | 1/2002 | Lee et al. |
| 6,356,758 | B1 | 3/2002 | Almeida et al. |
| 6,393,432 | B1 | 5/2002 | Flansburg et al. |
| 6,408,312 | B1 | 6/2002 | Forthman et al. |
| 6,442,507 | B1 | 8/2002 | Skidmore et al. |
| 6,470,195 | B1 | 10/2002 | Meyer |
| 6,487,417 | B1 | 11/2002 | Rossoni et al. |
| 6,493,679 | B1 | 12/2002 | Rappaport et al. |
| 6,496,290 | B1 | 12/2002 | Lee |
| 6,499,006 | B1 | 12/2002 | Rappaport et al. |
| 6,505,045 | B1 | 1/2003 | Hills et al. |

OTHER PUBLICATIONS

Shawn Steward, Sep. 1996, Intertec, vol. 13, pp. 22+.

Joseph R. Loring & Associates, Roger Skidmore et al.; Russell Senate Office Propigation Study—Project Update; Jan. 19, 1997.

T. S. Rappaport; Indoor Path Loss Measurements for Homes and Apartments at 2.4 and 5.58 GHz; Dec. 16, 1997.

Product Deascription TEMS Light, Ericsson, Sep. 9, 1996.

Jorgen Anderson et al.; Propagation Measurements and Models for Wireless Communications Channels; IEEE Communications Magazine; Jan., 1995; pp. 42–49.

Roger R. Skidmore et al.; Interactive Coverage and System Design Simulation for Wireless Communication Systems in Multifloored Indoor Environments: SMT Plus; IEEE ICUPC'96; Sep. 29–Oct. 2, 1996; pp. 646–650.

Software by Andrew titled "RF Planner" dated Jun. 17, 1997.

Auser Guide Titled "Andrew Microwave System Planner" dated Jul. 1999.

A user guide titled "Andrew Antenna System Planner" dated Jun. 1999.

Article "Building Database Manipulator" Copyright, Jan. 1998; MPRG and Virginia Tech.

PCS 97 Track 7; Engineering & Systems Management; T. Rappaport.

Propagator; vol. 8, No. 3; Fall 1997.

SMT Plus 1.0 User's Manual; R. Skidmore & T. Rappaport; Copyright, Aug. 1996; Virginia Tech.

From Bird's Eye Real–time Mapping Software dated Jun. 30, 2002.

IEEE Transactions on Antennas and propagation, vol. 46, No. 8, Aug. 1998. "Effect of Terrrain on Path Loss in Urban Enviroments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image–Based Wide–Band Propagation Model for In–Building Personal Communications Systems," International Journal of Wireless Information Networks, vol. 1, No. 1, 1994.

S. Kim et al., "Radio Propagation Measurements and Predictions Using Three–dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG–TR–95–14, Virginia Tech, Sep. 1995.

R. K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual. pp. 5–148 to 5–156, 1999.

M. Panjwani et al., "Interactive Computation of Coverage Regions for Wireless Communication in Multifloored indoor Environments," IEEE Journal on Selected Areas in Communications, vol. 14, No. 3, Apr. 1996.

L.Piazzi and H.L. Bertoni, "Achievable Acurracy of Site–Specific Path–Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T.S. Rappaport et al., "Radio Propagation Prediction Techniques and Computer–Aided Channeling Modeling for Embedded Wireless Microsystems," ARPA Annual Report, MPRG Technical Report MPRG–TR–94–12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG–TR–95–14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments." MPRG Technical Report MPRG–TR–95–14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore. "Introduction to In–Building Wireless Systems," Infocast In–Building Wireless Solutions Conference and Exposition, Feb. 4, 2003.

S. Sandhu, M.P. Koushik, and T.S. Rappaport "Predicted Path Loss for Roslyn VA, First set of predictions for ORD Project on Site Specific Propagation Prediction," MPRG Technical Report MPRG–TR–94–20, Virginia Tech. Dec. 1994.

S. Sandhu, M.P. Koushik, and T.S. Rappaport, "Predicted Path Loss for Roslyn VA, First set of predictions for ORD Project on Site Specific Propagation Prediction." MPRG Technical Report MPRG–TR–94–20. Virginia Tech. Mar. 1995.

S. Seidel et al., "Site–Specific Propagation Prediction for Wireless in–Building Personal Communication Design," IEEE Transactions on Vehicular Technology, vol. 43, No. 4, Nov. 1994.

S. Shakkottai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Micro–cellular Radio Communication System Design," IEEE Journal on Selected Areas in Communications, vol. vol. 14, No. 3, pp. 662–673, May 1996.

R, Skidmore et al., "A Comprehensive In–Building and Microcellular Wireless Communication System Design Tool" The Bradley Department of Electrical Engineering, MPRG–TR–97–13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract # Acbr96088, prepared for Office of the Architect of the Capital, Jan. 19, 1997.

R. Skidmore, et al., Russell Senate Office Building Propagation Study, Project Report for Joseph R. Loring & Associates: "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi–Floored Indoor Environments: SMT Plus *tm*," IEEE ICUPC Proceedings, 1996.

T.S. Rappaport et al., "Radio Propagation Prediction Techniques and Computer–Aided CHannel Modeling for Embedded Wireless Microsystems," MPRG Tech. Report MPRG–TR–95–08, Virginia Tech, Jul. 1995.

Company Web Page "Actix" www.actix.com product name: E–NOS (now E–AMS).

Company Web Page Agilent www.agilent.com product name: OPAS32.

Company Web Page "Agilent" www.agilent.com product name: Wizard.
Company Web Page "Comarco" www.edx.com product name: SignalPro.
Company Web Page "ComOpt" www.comopt.com product name: CellOpt AFP.
Company Web Page "Lucent" www.hell–labs.com product name: WiSE.
Company Web Page "Ericsson" www.ericsson.com product name: TEMS Lite.
Company Web Page "Ericsson" www.ericsson.com product name: TEMS.
Company Web Page "Marconi" www.marconi.com product name: PlaNET.
Company Web Page "Marconi" www.marconi.com product name: decibelPlanner.
Company Web Page "Schema" www.schema.com product name: Optimizer.
Company Web Page "ScoreBoard" www.scoreboard.com product name: ScoreBoard.
Product Deascription TEMS Light, Ericsson, Sep. 9, 1996.
Walk about PCS—Portable Coverage Survey System; SAFCO.
LLC International, Inc.; Pen–Based Collection and Analysis Tool; PenCat; Http://www.Iccinc.com/prodserve/PRODUCTS/pencat.html.
Jorgen Anderson et al.; Propagation Measurements and Models for Wireless Communications Channels; IEEE Communications Magazine; Jan., 1995; pp. 42–49.
Roger R. Skidmore et al.; Interactive Coverage and System Design Simulation for Wireless Communication Systems in Multifloored Indoor Environments: SMT Plus; IEEE ICUPC'96; Sep. 29–Oct. 2, 1996; pp. 646–650.
Scott Y Siedel et al.; The Impact of Surrounding Buildings on Propagation for Wireless In–Building Personal Communications System Design.

SYSTEM AND METHOD FOR MEASURING AND MONITORING WIRELESS NETWORK PERFORMANCE IN CAMPUS AND INDOOR ENVIRONMENTS

CROSS-REFERENCE TO RELATED APPLICATIONS

The above-identified application is a continuation of U.S. Ser. No. 09/221,985, filed December 29, 1998, now U.S. Pat. No. 6,442,507, and the complete contents of that application is herein incorporated by reference.

DESCRIPTION BACKGROUND OF THE INVENTION

1. Field of the Invention

The invention generally relates to an indoor mobile wireless communication data measurement system and more particularly to an indoor signal property measuring device that utilizes a mobile personal computer connected to a receiver for measuring location specific wireless communication system signal properties and data network throughput properties within a facility and embedding the measured properties at the measurement location within a three-dimensional drawing of the facility stored in the computer.

2. Description of the Related Art

In recent years the use of wireless communication technology, such as cellular phone networks, has greatly increased. Moreover, it has become common to implement wireless communication systems within buildings or large facilities comprising several buildings. Examples of typical wireless communication systems are local area networks (LAN), wide area networks (WAN), or cellular phone networks such as PBX, or local loops. Due to the increasingly diverse applications of wireless communication systems, system designs have become increasingly complicated and difficult to implement.

Common to all wireless communication system designs, regardless of technology, size or scale, is the need for measurement data at some point in the design process. Whether in the initial design stage or the final verification stage, no wireless communication system is implemented without the input of measurement data. However, measurement acquisition in in-building environments is much more tedious and time consuming than in the macrocellular environment where measurement acquisition is carried out using Global Positioning System data to determine the location of the measurement being taken. Global Positioning System (GPS) data, which so many RF engineers have come to rely upon for outdoor measurement acquisition, is not an option for microcell environments. Therefore, recording real-time measurement data within a building becomes a laborious, time-consuming task involving scratched notes and blueprints and manual data entry which are both expensive and ineffectual in many respects.

In addition to measuring RF signal properties from emitted base transceivers there is also a need to measure data throughput time in computer data networks. Throughput time is the time required to transfer a record or file of known size from one computer to another. In order to standardize the measurement of data throughput time for comparison or verification purposes, files of a set size (e.g. 100K) are used and transferred in packet sizes such as 512 bytes. Similar to RF signal attenuation, data throughput time is also a function of transmission distance and signal obstruction (e.g. walls, doors, partitions), as well as multipath propagation and the specific radio modem design.

Various signal property measurement acquisition tools and systems have been developed to aid in the design of wireless communication systems such as PenCat™, Walkabout PCS™ and TEMS Light.

LCC International Inc. offers the PenCat™ as a pen-based collection and analysis tool for wireless communication design that runs on a small hand-held tablet computer. The PenCat™ system enables a user to roam about a building, take signal property measurement data at a location in the building using a receiver linked to the tablet computer, and link the measured data to that building location on a computer map representing the building by tapping the appropriate portion of the map on the computer screen with a stylus pen. The building map can be entered into the PenCat™ system by either scanning blueprints, sketching the building within the application, or importing from another source.

Safco Technologies, Inc. offers the Walkabout PCS™ system as a portable survey coverage system for use in indoor or outdoor wireless communication system design. Similar to PenCat™, the Walkabout PCS™ system utilizes a hand-held computer linked to a receiver for measuring signal properties at a given location and linking the measured property data to that location represented on a stored computer map.

Ericsson Radio Quality Information Systems offers the TEMS Light system as a verification tool for wireless communication indoor coverage. The TEMS Light system utilizes a Windows-based graphical interface on a mobile computer linked to a receiver to allow a user to view a stored building map, make location specific data measurements, and link the measured data to the represented location on the stored computer map.

In addition to the above-discussed wireless communication systems verification tools, various wireless communication system prediction tools have also been devised such as Wireless Valley Communications Incorporated's Predictor™ and Ericsson Radio Quality Information Systems' TEMS. Predictor™ allows a wireless communication system designer to predict the coverage area of a particular wireless system in a building or across multiple buildings. Predictor™ creates a computer simulation using a computer stored building or facility database and a defined transceiver location and type within the database. Based on the building configuration and building material properties defined in the database a prediction of the coverage area of the wireless system is extrapolated by site-specific propagation whereby rays drawn between the transmitter and receiver and three-dimensional building information are used for prediction computations. The TEMS system predicts indoor coverage of a wireless system based on a stored building map and input base transceiver locations and types using statistical radio coverage models.

While the above-mentioned design and verification tools have aided wireless system designers in creating indoor wireless communication systems using building drawings and linking data measurements to building drawings, none of the devices, except Predictor™, incorporate three-dimensional building drawings to enhance the design process. Further, the above-mentioned devices and systems lack the ability to track a roving user within the building while the user is taking measurement data. Even further, none of the above-mentioned devices contemplates measuring data throughput properties for a computer data network at various locations within a facility. These capabilities may be required for installation and management of wireless devices for global network access.

SUMMARY OF THE INVENTION

It is therefore an object of the present invention to facilitate measurement data acquisition for designing wireless communication systems within a facility.

It is another object of the present invention to scan, sketch, or import drawings of a facility into a computer to create a three-dimensional drawing database.

It is another object of the present invention to embed measured location-specific signal properties in a site-specific three-dimensional drawing database.

It is yet another object of the present invention to embed measured location-specific LAN data throughput properties in a site-specific three-dimensional drawing database.

It is still another object of the present invention to track a user within a building using a distance measuring mechanism and a stored site-specific three-dimensional drawing database.

It is yet another object of the present invention to average incoming measurement data over an interval of time or a unit distance.

The invention uses a three-dimensional drawing database of a facility and can position measured site-specific signal property information within a microcell environment using small, portable transceivers or receivers which continually report their measurement findings in real-time through a communication link with a computer (e.g., serial port, parallel port, or buffering circuit). The computer may be a personal computer, laptop, or other mobile computer. The process of taking in-building measurement data is then reduced to simply setting up a test transmitter at the selected facility site, configuring the transmitter within the three-dimensional drawing database, connecting the portable transceiver or receiver to the computer, and roaming throughout the three-dimensional drawing environment, identifying where the receiver is in the building at any given time by pointing and clicking within the drawing or employing a location tracking mechanism. A wheeled tracking mechanism is carried with a user and linked to the computer for measuring roaming distance between time intervals based on the number of wheel rotations. At each time interval the receiver location is identified, using the distance traveled by the tracking mechanism. Simultaneously, measurement data from the connected receiver is recorded, logged, and embedded directly in the three-dimensional drawing at the identified location. While the wheeled tracking mechanism is described in the preferred embodiment, other types of tracking or distance measuring devices can be used (e.g. laser range finder, sonar range finder).

An alternative to using a tracking device is to select a starting location in the stored three-dimensional facility drawing database and begin walking and measuring signal properties. Then select a stopping location once the walking and measuring process is stopped. Based on the starting and stopping locations the computer calculates a straight line path between the locations and distributes the measured data in one of several user specified formats. The user may specify that the measured data be distributed along the path at intervals of time, distributed along the path at units of length, or averaged and distributed along the path at units of length or time.

Using similar measurement acquisition methods described above the data throughput properties of a wireless computer data network can also be measured. This is accomplished by creating a link between a server computer and a mobile client computer, transferring a record of standardized size between the server and mobile client computer, and measuring the time required to transfer the record. This process can be carried out at a plurality of locations within a facility. At each location the measured time is recorded and embedded at the measurement location within a three-dimensional facility drawing database. Additionally, the server computer can also be mobile.

In addition to creating a three-dimensional database model and performing measurements in in-facility wireless communications and data networks the invention is capable of verifying the signal properties and data throughput properties of existing wireless communication and data networks.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
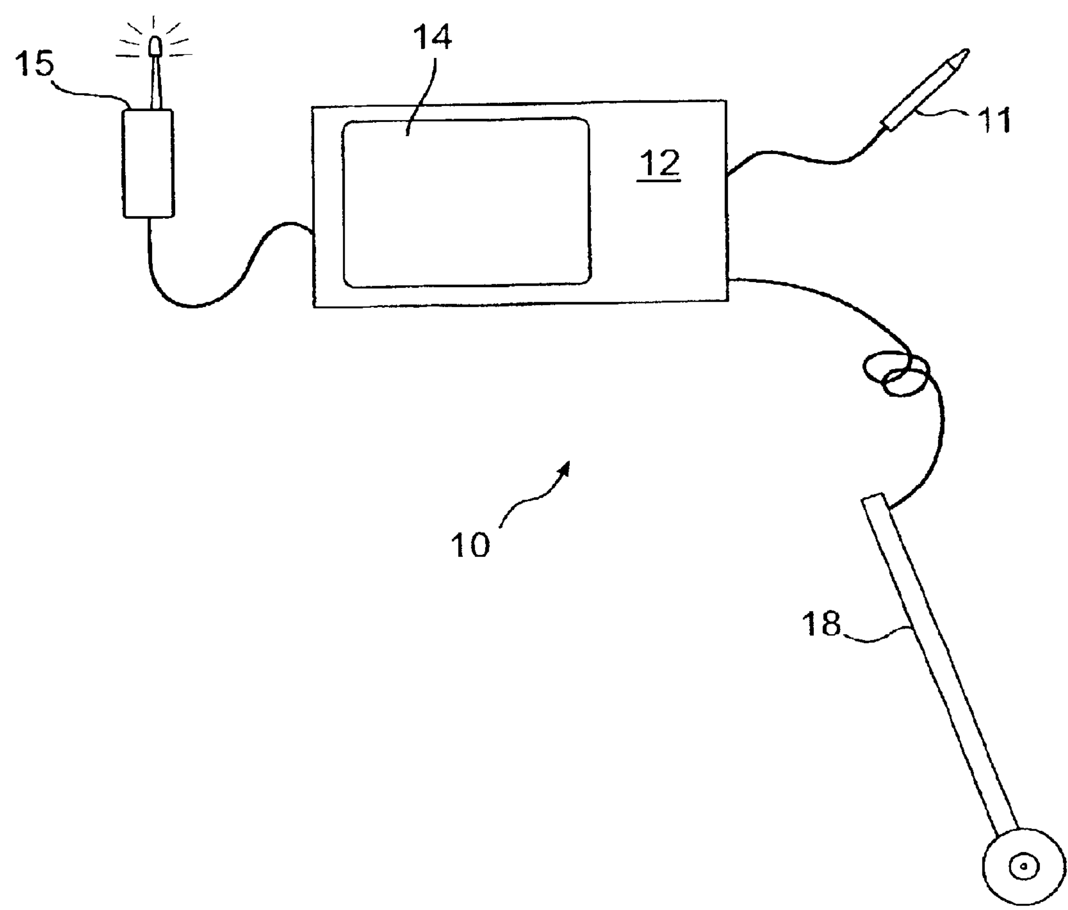
FIG. 1 is a schematic representation of the preferred embodiment of the measuring apparatus.

Referring now to FIG. 1 there is shown a mobile system 10 for measuring location-specific signal properties within a facility such as a building or a campus of buildings (not shown). A transceiver or receiver for receiving signals from a base transceiver is connected to a mobile computer 12 through the computer's serial port (not shown). The computer 12 runs a software program (not shown) and has a display 14 for displaying a three-dimensional facility drawing stored on the mobile computer's disk drive and a wheeled distance measuring device 18 for measuring the distance traversed by the user of the mobile computer 12 as he/she roams about the facility. When measurement data is to be recorded, the user may manually point and click on the building drawing portion on the display 14 representing his/her actual location in the facility and take a measurement. Once recorded, the measurement data will be logged and embedded in the stored three-dimensional building drawing database at that location. Alternately, the user may employ the distance measuring device 18 connected to the mobile computer 12. Using the distance measuring device 18 a user may select a starting point in the building drawing displayed on the computer display 14 using manual coordinate input or a point and click device 11. Once the starting point is defined the user begins walking in a predefined direction such that at periodic time intervals the distance from the input starting point is recorded and signal measurement is taken. Both the distance measurement and signal measurement are embedded in the building drawing database as a measurement and corresponding building drawing location. Alternately, in addition to or in lieu of the wheeled distance measuring device 18 shown in FIG. 1, other distance measuring devices may be used.

The three-dimensional building drawing database stored in the mobile computer 12 may be imported from another computer, scanned in from an existing paper drawing, or drawn using the computer 12. Regardless of how the drawings are entered into mobile computer 12, the drawings may be manipulated and modified within the computer depending on the needs of the user.

The system described in FIG. 1 is capable of interfacing with a variety of transceivers or receivers such as, but not limited to, the ZK-Celltest SAM with cellular phone and real-time serial port interface, the Tektronix 2782 Spectrum Analyzer with a real-time IEEE 488.2M interface, a Proxim RangeLAN™ wireless modem, and a receiver without real-time interface.

Figure 2A:
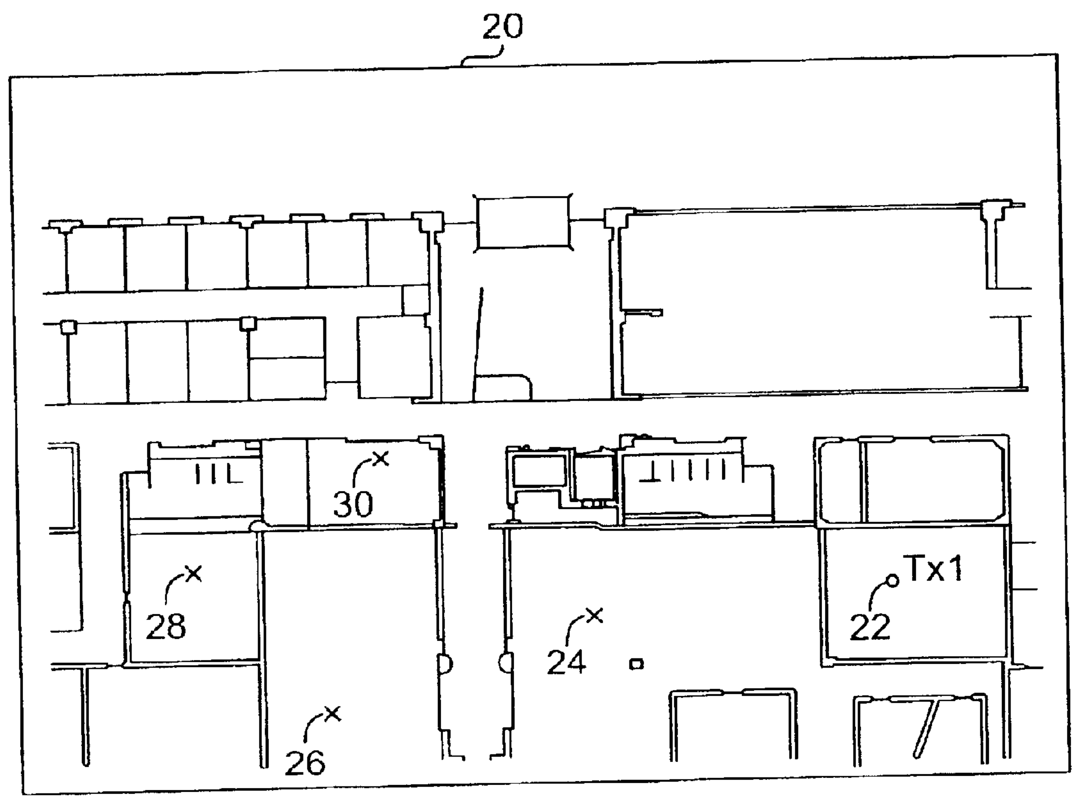
FIG. 2A is a representation of a computer screen according the preferred embodiment of the present invention showing a top view of a building floor plan with various measurement location points.

FIG. 2A shows a portion of a building floor represented on a computer screen 20 using a stored three-dimensional building drawing database. The building floor plan is shown as a typical top plan view wherein walls and partitions are noted by double lines and doorways are denoted by dotted lines. Before measurement gathering, the location of a base transceiver 22 is first entered into the three-dimensional building drawing database wherein the location is the two-dimensional position (x and y axis) of the transceiver within the plane of the floor and the height (z) of the transceiver above the floor. Then the user roams throughout the building with a mobile measuring apparatus as shown in FIG. 1, selects a location point 24, and measures the desired signal properties received from the transceiver 22. The measured signal properties are then logged and embedded into the three-dimensional building drawing database at the selected location point. After selecting a location 24 and making a measurement, the user may select more locations 26, 28, 30 and take more measurements at these respective locations for embedding in the building drawing database. Similar to the transceiver location, the height above the floor of measurement locations 24, 26, 28, 30 can also be specified. Hereinafter, location will be considered a three-dimensional position.

Figure 2B:
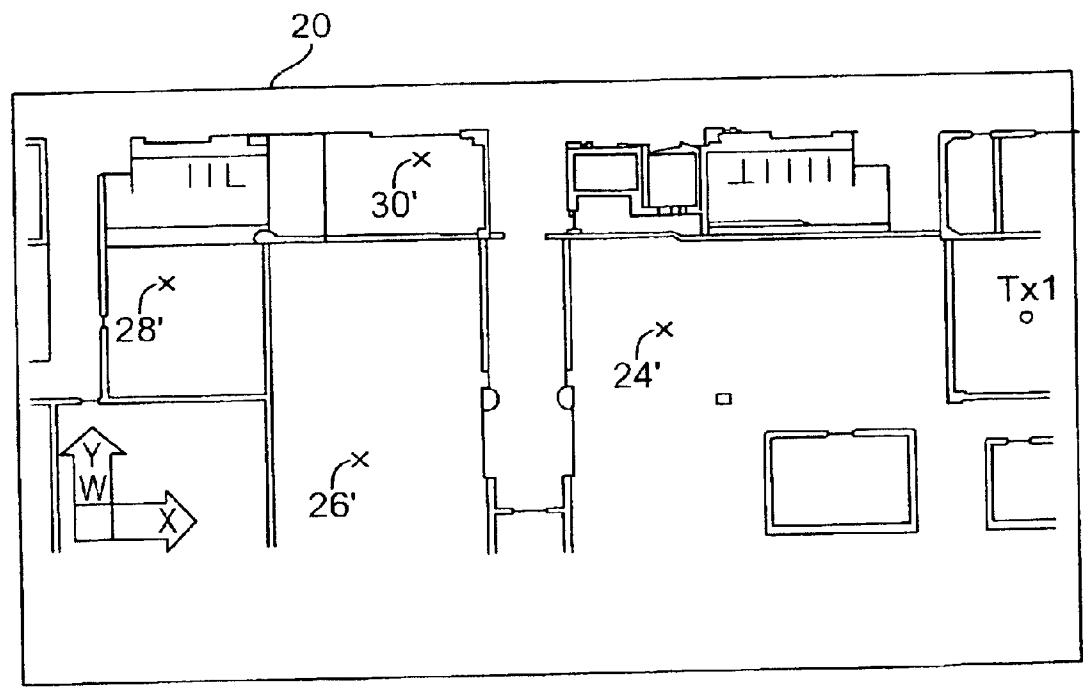
FIG. 2B is a representation of a computer screen according the preferred embodiment of the present invention showing a top view of a building floor plan with measured data values at their respective measurement points.

After the location-specific measurements 24, 26, 28, 30 have been taken, logged and embedded into the building drawing database, the results for each location can be displayed on the computer screen 20 as shown in FIG. 2B by 24', 26', 28', 30'. For example, as shown at point 24, a measured signal of −78.0 dBm was recorded, at point 26 a measured signal of −88.1 dBm was recorded, and so on.

Figure 3:
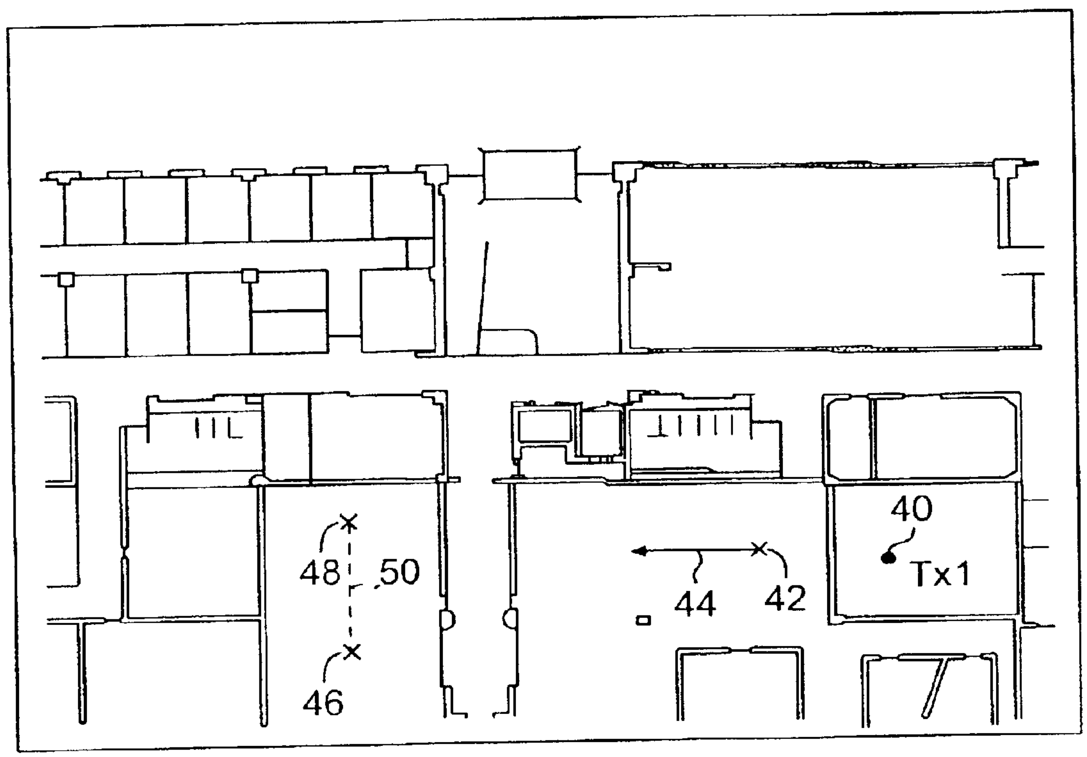
FIG. 3 is a representation of a computer screen according the preferred embodiment of the present invention showing a top view of a building floor plan with measurement acquisition locations.

FIG. 3 shows an alternate method for measurement acquisition using a user location tracking device. First, the base transmitter type and location 40 are defined in the building drawing database. Then a starting location 42 and a direction of travel 44 are defined in the building drawing database. Once the starting location 42 and direction of travel 44 are defined, the user simply starts the measurement process and walks in the defined direction. While walking, signal property measurements and the distance traveled from the starting point 42 are taken at periodic time intervals. Then using the defined starting point 42, direction of travel 44, and distance traveled a location within the building is calculated by the mobile user computer and the recorded measurement and location are embedded in the building drawing database. Several signal property measurements and corresponding distance measurements can be taken between the starting point 42 and the end of the operation. Additionally, instead of defining a direction of travel, start and stop points 46 and 48, respectively, may be defined within the drawing database such that the user walks between the two points 46 and 48, and a tracking device 18 measures the distance traveled while signal property measurements are taken at periodic time intervals and embedded in the building drawing database at the calculated location between points 46 and 48.

Another method of acquiring measurement data is for the user to specify a starting location 46, by clicking on the displayed building database, and walk a straight path while the attached measurement receiver is measures signal properties of signals emitted from base transceiver 40. The user then identifies the location 48 where he/she stopped walking, by clicking on the displayed building database. The computer then calculates a linear path 50 between the start 46 and stop 48 points. After the linear path 50 is calculated, the user has several options for distributing the measured data along the linear path 50 for subsequent embedding in the building drawing database. The user can specify that data should be recorded and embedded at specified time intervals. In this case, the recorded data is spaced evenly along the linear path 50 with each sequential measurement separated by the specified time interval. The other option is to distribute by distance. In this case, the recorded data is spaced evenly along the linear path 50 with each sequential measurement separated by a specified unit length. If more measurement data is available than recording slots along the path, the data can be averaged.

Using the measurement acquisition methods described in conjunction with FIGS. 2A and 3, signal properties can be measured at each floor of a multi-story building separately or all floors can be measured in a single run so long as the appropriate floor location is entered at the time of a measurement recording. Once measurements are recorded for the desired floors a three-dimensional model can be formed by either joining the separate floor measurements or using the single run having multiple floors.

Figure 4A:
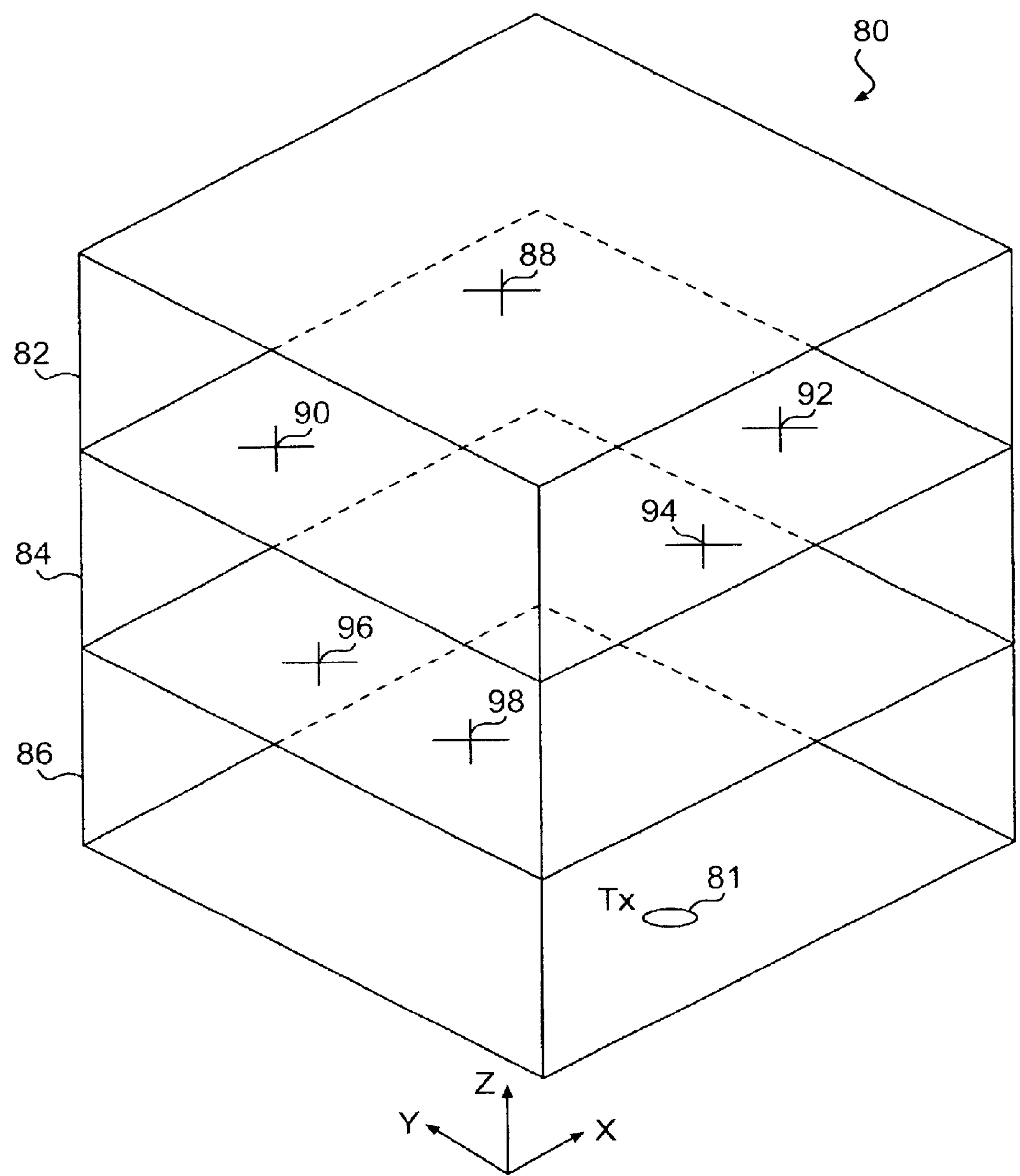
FIG. 4A is a perspective view of a three-dimensional building drawing as viewed from a computer display.

FIG. 4A shows a three-dimensional representation of a building 80 as might be seen on a mobile computer screen (FIG. 1). The building 80 has three floors 82, 84, 86. Measurement of the signal properties from transceiver 81 on floor 86 may be accomplished either on a floor by floor basis or as a single run. For example, signal property measurement locations 88, 90, 92 are measured on floor 82 and stored. Then, signal property measurement locations 94, 96 are measured on floor 84 and stored. Then, signal property measurement location 98 is measured on floor 86 and stored. Finally, all of the stored floors 82, 84, 86 along with the measured data embedded in each floor, may be aligned and joined together as a single database from which a model of the measured signal properties may be constructed. Alternately, measurement locations 88, 90, 92, 94, 96, 98 may be taken in random order and input into a single multi-floor database so long as the correct location of measurement us given. The correct location means the floor with the height above the floor (Z axis) on which the measurement is being taken and the location coordinates within the plane of the floor (X and Y axis) where the measurements are taken.

Figure 4B:
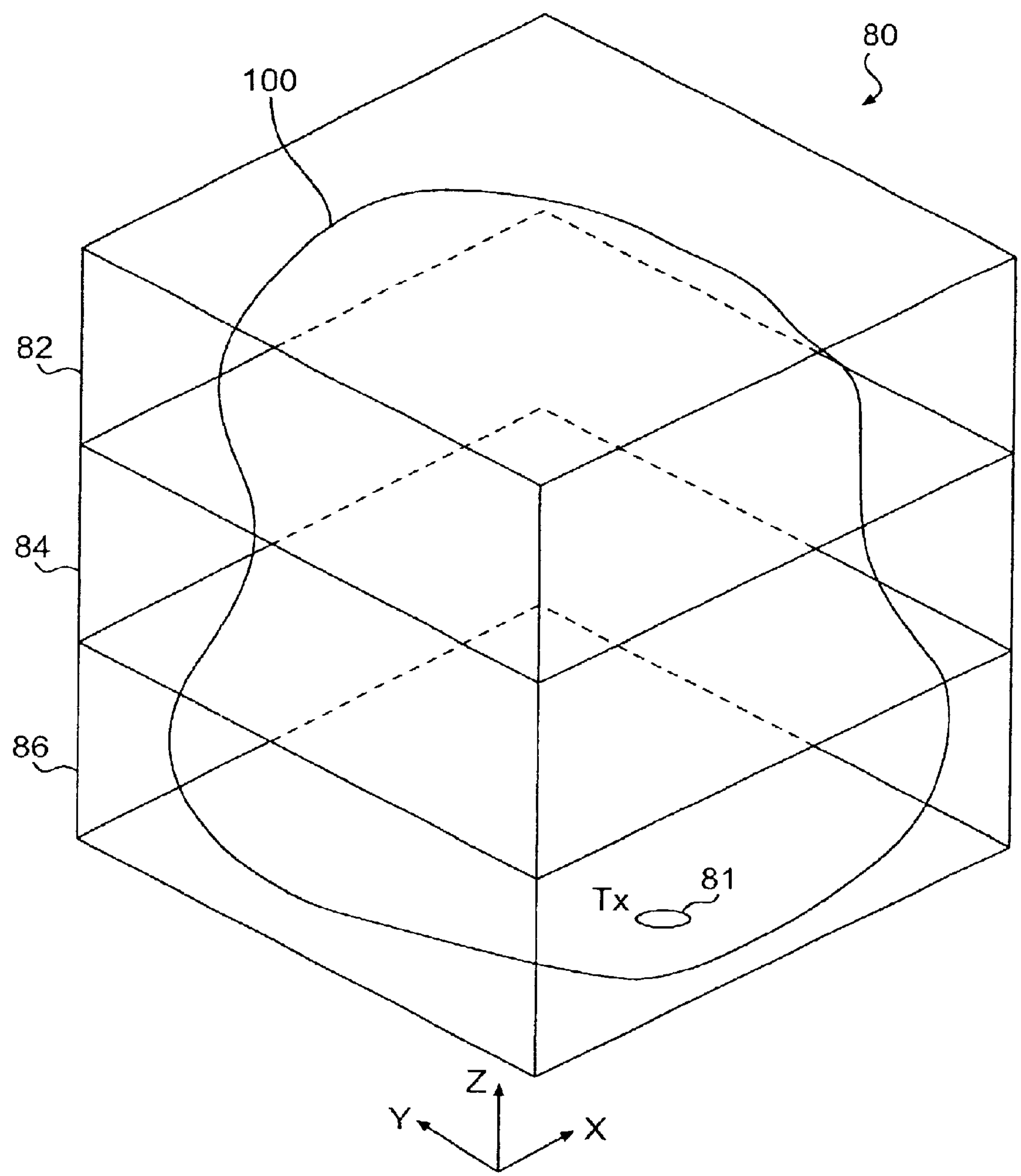
FIG. 4B is a perspective view of a three-dimensional building drawing and computer model of measured signal properties as viewed from a computer display.

FIG. 4B is a three-dimensional computer model of measured signal properties taken in FIG. 4A wherein the model may represent the best coverage area in building 80 based on the location of transceiver 81. However, it should be understood that the model 100 is simplified for exemplary purposes. Actual models will vary greatly in shape, size and complexity due to building configurations, transceiver placement, building materials, and the data being represented. Additionally, models can be created for any measured signal property.

Figure 5A:
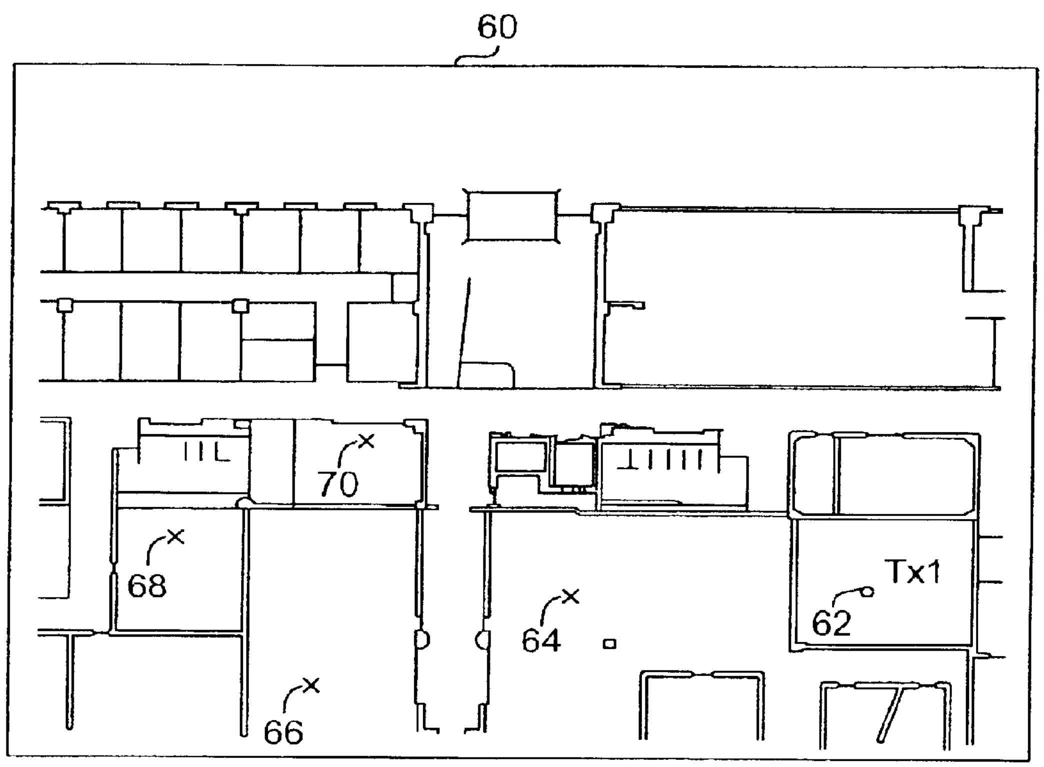
FIG. 5A is a representation of a computer screen according to the preferred embodiment of the present invention showing a top view of a building floor plan with various measurement location points.

FIG. 5A shows a portion of a building floor represented on a computer screen 60 using a stored facility drawing database. The building floor plan is shown as a typical top plan view wherein walls and partitions are noted by double lines and doorways are denoted by dotted lines. Before measurement gathering, the location of a base server computer 62 is first entered into the facility drawing database. Then the user roams throughout the facility with a mobile measuring apparatus as shown in FIG. 1, selects a location point 64, initiates a File Transfer Protocol (FTP), and connects to the base server computer 62 as a client. Once connected to the base server computer 62 the mobile measuring apparatus acting as a client computer transfers a selectable standard size file (e.g. between 1 Kb and 10 Mb) and a selectable packet size (e.g. 32 bytes to 4 Kb) to the base server computer and records the data throughput time for location 64. The measured and recorded data throughput time is then embedded into the building drawing database at the selected location point 64. After selecting a location 64 and making a measurement, the user may select more locations 66, 68, 70 and take more measurements at these respective locations for embedding in the building drawing database.

Figure 5B:
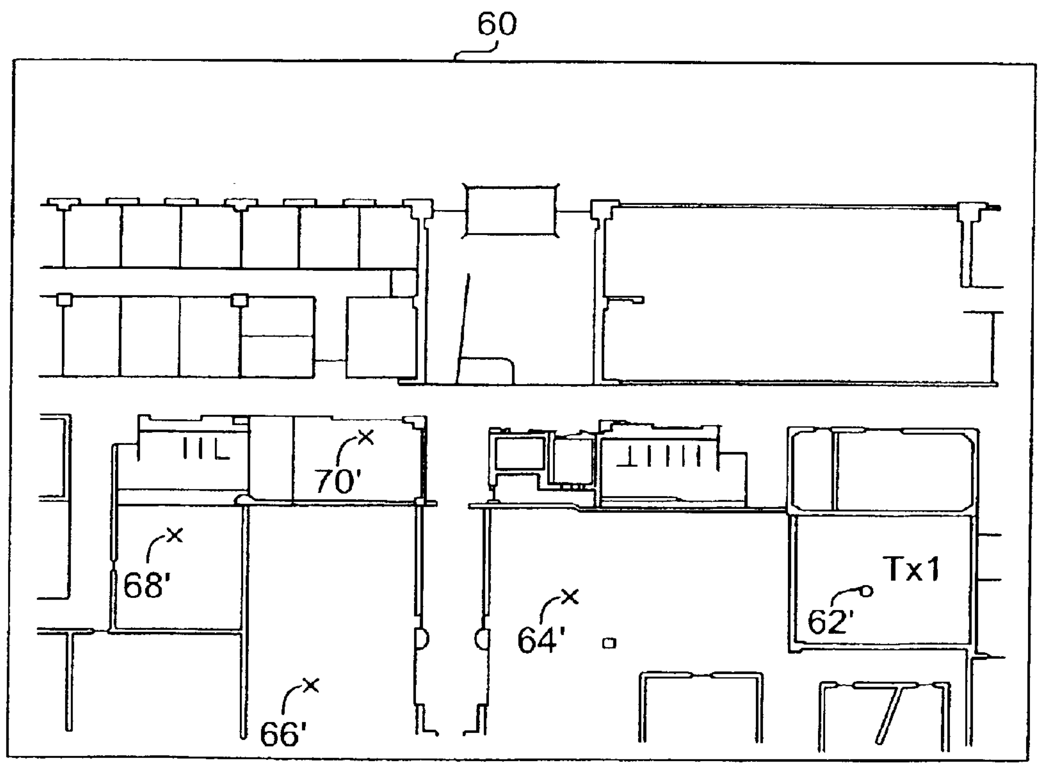
FIG. 5B is a representation of a computer screen according the preferred embodiment of the present invention showing a top view of a building floor plan with measured data throughput values at their respective measurement points.

After the location-specific measurements 64, 66, 68, 70 have been taken, logged and embedded into the building drawing database, the results for each location can be displayed on the computer screen 60 as shown in FIG. 5B by 64', 66', 68', 70'. For example, as shown at point 64', a measured throughput time of 54.2 kbps was recorded, at point 66' a measured throughput time of 53.0 kbps was recorded, and so on.

The data throughput property gathering scheme outlined in conjunction with FIG. 5A can be carried out for each floor in a multi-floor facility or, as shown in FIG. 4A, as a single run so long as the correct floor is selected from the facility drawing database at the time of measurement. Once data throughput measurements are recorded for the desired floors a three-dimensional model can be formed by either joining the separate floor measurements or using the single run containing multiple floors. Similar to FIG. 4B, a three-dimensional computer model created from the measured data may be configured to model the measured throughput properties in various useful ways such as the best throughput time locations or the degradation or improvement of throughput time based on location.

Note that in addition to data throughput rate over the wireless channel, the present invention incorporates the ability to measure frame errors, packet retries, network data throughput, and network delay due to the fixed non-wireless portion of any network, such capabilities being dependent upon the specific connected radio transceivers or receivers and the particular transfer protocol.

While the invention has been described in terms of its preferred embodiments, those of skill in the art will recognize that the invention can be practiced with modification within the spirit and scope of the appended claims.

We claim:

1. A system for measuring signal properties within a facility, comprising:

at least one transceiver or receiver that is moveable and able to measure signal properties at one or more locations within said facility;

means for representing said facility in a computer database model;

means for determining a location of said moveable transceiver or receiver within said facility; and means for embedding measured signal properties as they are made at said one or more locations within said computer database model of said facility, said means for determining and said means for embedding being operable at said one or more locations.

2. The system of claim 1 wherein said facility is a multi-level building and said means for determining can identify a level of said moveable transceiver or receiver within said multi-level building.

3. The system claim 1 wherein said facility is a plurality of multi-level buildings and said means for determining can identify a building and a level within said building of said moveable transceiver or receiver within said plurality of multi-level buildings.

4. The system of claim 1 wherein said site specific drawing computer database of said facility uses a three-dimensional model.

5. The system of claim 1 wherein said means for determining operates on an automated basis.

6. The system of claim 1 further comprising means for displaying said site specific drawing computer database of said facility with embedded measured signal properties.

7. The system of claim 1 wherein said means for determining a location is a location tracking mechanism or positioning device.

8. The system of claim 1 wherein said measured signal properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_c/I_o$, system performance parameters, equipment price, maintenance and cost information, all in either absolute or relative terms.

9. The system of claim 1 wherein said site specific drawing computer database includes site specific information.

10. The system of claim 9 further comprising means for forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

11. The system of claim 10 wherein site specific models formed by said means for forming model a network selected from the group consisting of microcell communications systems, local area networks, wireless local area networks, wide area networks, campus and in-building wireless and wired communication networks, data networks, sensor networks, ad hoc networks and wireless communication networks.

12. The system of claim 1 further comprising a means for manipulating or modifying one or more drawings in said site specific drawing computer database.

13. The system of claim 12 wherein said means for manipulating or modifying allows altering site specific content of said one or more drawings.

14. The system of claim 13 wherein said site specific content of said one or more drawings is selected from the group consisting of building materials, building configuration, transceiver locations, measurement locations, modeled signal properties, modeled network properties, partition types, measured signal properties, and measured network properties.

15. The system of claim 1 wherein said site specific drawing computer database represents a three dimensional position location by specifying a point in space using an x, y coordinate pair and a height value above a floor or ground within a facility.

16. The system of claim 1 wherein said site specific drawing computer database represents a two-dimensional location as a point on a top-plan view of a floor plan of said facility.

17. The system of claim 1 wherein said site specific drawing computer database identifies a transmitter, receiver or transceiver location within said facility.

18. The system of claim 17 wherein an identified transmitter, receiver or transceiver location within said site specific computer drawing database of said facility is altered by movement of said transmitter, receiver or transceiver.

19. The system of claim 1 wherein said site specific drawing computer database includes at least one floor plan of one or more floors of one or more buildings in said facility.

20. The system of claim 1 wherein said site specific drawing computer database includes a plurality of floor plans of one or more floors of one or more buildings in said facility.

21. The system of claim 1 further comprising means for verifying performance of communication or data networks.

22. The system of claim 1 further comprising means for averaging measured signal properties over space or time.

23. The system of claim 1 wherein measured signal properties are embedded in said site specific drawing computer database using periodic distance intervals.

24. The system of claim 1 wherein measured signal properties are embedded in said site specific drawing computer database using periodic time intervals.

25. The system of claim 1 wherein said means for embedding embeds measured signal properties taken while said moveable receiver or transceiver is moving throughout said facility.

26. The system of claim 1 wherein said means for embedding embeds measured signal properties taken while said moveable receiver or transceiver is stationary at a selected location in said facility.

27. The system of claim 1 further comprising a means for defining a direction of travel of said moveable receiver or transceiver.

28. The system of claim 1 further comprising a means for defining a starting point and an ending point for said moveable receiver or transceiver.

29. The system of claim 1 further comprising means for joining separate floor measurements collected within said facility.

30. The system of claim 1 wherein said site specific computer database provides a three dimensional representation of said facility with embedded measurements obtained from said means for embedding.

31. A system for measuring network properties within a facility, comprising:

a client computer that may be moved within a facility;

a server computer or other mobile client computer for hosting said moveable client computer;

means for recording network properties between said moveable client computer and said server computer or other mobile client computer at a plurality of locations within said facility;

means for representing said facility in a site specific drawing database; and means for embedding said recorded network properties at each of said plurality of locations within said database model of said facility.

32. The system of claim 31 wherein said recorded network properties include recorded data as a function of time or location within said facility.

33. The system of claim 31 wherein said facility is a multi-level building, and further comprising a means for identifying a level of said multi-level building where said means for recording is located.

34. The system of claim 31 wherein said facility comprises a plurality of multi-level buildings and further comprising a means for identifying a building and a level of said plurality of multi-level buildings where said means for recording is located.

35. The system of claim 31 wherein said system includes a means for periodically determining a location of said mobile client computer within said facility.

36. The system of claim 35 wherein said means for periodically determining operates on an automated basis.

37. The system of claim 31 wherein said means for embedding operates on an automated basis.

38. The system of claim 31, wherein said site specific drawing database of said facility uses a three-dimensional model.

39. The system of claim 31 wherein said server computer is mobile.

40. The system of claim 31 wherein said network properties include data throughput rate, frame errors, packet retries, network data throughput, and network delay due to a fixed non-wireless portion of a network.

41. The system of claim 31 wherein said network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

42. The system of claim 31 further comprising means for displaying said site specific drawing database of said facility with embedded recorded network properties.

43. The system of claim 31 further comprising a location tracking mechanism or positioning device for determining a position of said mobile client computer in said facility.

44. The system of claim 31 wherein said means for embedding operates to embed said recorded network properties as they are made.

45. The system of claim 31 wherein said site specific drawing database includes site specific information.

46. The system of claim 45 further comprising means for forming site-specific models of network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

47. The system of claim 46 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

48. The system of claim 45 wherein said site specific information is selected from the group consisting of building materials, building configuration, transceiver locations, measurement locations, modeled signal properties, modeled network properties, partition types, measured signal properties, and measured network properties.

49. The system of claim 31 further comprising a means for manipulating or modifying one or more drawings in said site specific drawing database.

50. The system of claim 49 wherein said means for manipulating or modifying allows altering site specific content of said one or more drawings.

51. The system of claim 50 wherein said site specific content of said one or more drawings is selected from the group consisting of building materials, building configuration, transceiver locations, measurement locations, modeled signal properties, modeled network properties, partition types, measured signal properties, and measured network properties.

52. The system of claim 31 wherein said site specific drawing database represents a three dimensional position location by specifying a point in space using an x, y coordinate pair and a height value above a floor or ground within a facility.

53. The system of claim 31 wherein said site specific drawing database represents a two-dimensional location as a point on a top-plan view of a floor plan of said facility.

54. The system of claim 31 wherein said site specific drawing database identifies a transmitter, receiver or transceiver location within said facility.

55. The system of claim 54 wherein an identified transmitter, receiver or transceiver location within said site specific drawing database of said facility is altered by movement of said transmitter, receiver or transceiver.

56. The system of claim 31 wherein said site specific drawing database includes at least one floor plan of one or more floors of one or more buildings in said facility.

57. The system of claim 31 wherein said site specific drawing database includes a plurality of floor plans of one or more floors of one or more buildings in said facility.

58. The system of claim 31 further comprising means for verifying performance of communication or data networks.

59. The system of claim 31 further comprising means for averaging measured network properties over space or time.

60. The system of claim 31 wherein measured network properties are embedded in said site specific drawing database using periodic distance intervals.

61. The system of claim 31 wherein recorded network properties are embedded in said site specific drawing database using periodic time intervals.

62. The system of claim 31 wherein said means for embedding embeds said network properties as they are measured.

63. The system of claim 31 wherein said means for embedding embeds network properties taken while said mobile client computer is moving throughout said facility.

64. The system of claim 31 wherein said means for embedding embeds recorded network properties taken while said mobile client computer is stationary at a selected location in said facility.

65. The system of claim 31 further comprising a means for defining a direction of travel of said mobile client computer.

66. The system of claim 31 further comprising a means for defining a starting point and an ending point for said mobile client computer.

67. The system of claim 31 further comprising means for joining separate floor measurements collected within said facility.

68. The system of claim 31 wherein said site specific drawing database provides a three dimensional representation of said facility with embedded measurements obtained from said means for embedding.

69. The system of claim 31 wherein said server computer or other mobile client computer is not located on the premises of the facility.

70. The system of claim 31 wherein said server computer or other mobile computer is located on the premises of the facility.

71. A system for measuring signal or network properties, comprising:

a site specific drawing database of a facility, said specific drawing database providing a computerized representation of a facility which includes at least a portion of one building; and means for embedding measurements of signal or network properties obtained from one or more locations in said facility into said site specific drawing database wherein each of said measurements being inputted is associated with location information descriptive of a location of said one or more locations where said measurements of said signal or network properties were made within said facility.

72. The system of claim 71 further comprising:

a receiver or transceiver for making one or more measurements;

measurement location determining device or location determining system for determining a location of each measurement; and means for either or both storing or communicating to said site specific drawing database said one or more measurements and said location of each measurement.

73. The system of claim 72 wherein said receiver or transceiver automatically makes measurements at a timed interval.

74. The system of claim 72 wherein said receiver or transceiver is equipped with a means for making measurements selectively after said receiver or transceiver has been located at a desired location within said facility.

75. The system of claim 71 wherein said means for embedding operates on an automated basis.

76. The system of claim 71 further comprising means for displaying said site specific drawing database of said facility with embedded measured signal or network properties.

77. The system of claim 71 further comprising a location tracking mechanism or positioning device.

78. The system of claim 71 wherein said site specific drawing database includes site specific information.

79. The system of claim 78 further comprising means for forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

80. The system of claim 79 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

81. The system of claim 78 wherein said site specific information is selected from the group consisting of building materials, building configuration, transceiver locations, measurement locations, modeled signal properties, modeled network properties, partition types, measured signal properties, and measured network properties.

82. The system of claim 71 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

83. The system of claim 71 further comprising a means for manipulating or modifying one or more drawings in said site specific drawing database.

84. The system of claim 83 wherein said means for manipulating or modifying allows altering site specific content of said one or more drawings.

85. The system of claim 84 wherein said site specific content of said one or more drawings is selected from the group consisting of building materials, building configuration, transceiver locations, measurement locations, modeled signal properties, modeled network properties, partition types, measured signal properties, and measured network properties.

86. The system of claim 71 wherein said site specific drawing database represents a three dimensional position by specifying a point in space using an x, y coordinate pair and a height value above a floor or ground within a facility.

87. The system of claim 71 wherein said site specific drawing database represents a two-dimensional location as a point on a top-plan view of a floor plan of said facility.

88. The system of claim 71 wherein said site specific drawing database identifies a transmitter, receiver or transceiver location within said facility.

89. The system of claim 88 wherein an identified transmitter, receiver or transceiver location within said site specific drawing database of said facility is altered by movement of said transmitter, receiver or transceiver.

90. The system of claim 71 wherein said site specific drawing database includes at least one floor plan of one or more floors of one or more buildings in said facility.

91. The system of claim 71 wherein said site specific drawing database includes a plurality of floor plans of one or more floors of one or more buildings in said facility.

92. The system of claim 71 further comprising means for verifying performance of communication or data networks.

93. The system of claim 71 further comprising means for averaging measured signal or network properties over space or time.

94. The system of claim 71 wherein measured signal or network properties are embedded in said site specific drawing database using periodic distance intervals.

95. The system of claim 71 wherein measured signal or network properties are embedded in said site specific drawing database using periodic time intervals.

96. The system of claim 71 wherein said one or more locations are identified and embedded on an automated basis in said embedding step.

97. The system of claim 71 wherein said measurements of signal or network properties are embedded on an automated basis in said embedding step.

98. The system of claim 71 further comprising a display for displaying said computerized representation of said facility with embedded measurements of signal or network properties.

99. The system of claim 71 wherein said means for embedding embeds measured signal properties taken while a mobile receiver or transceiver is moving throughout said facility.

100. The system of claim 71 wherein said means for embedding embeds measured signal properties taken while a mobile receiver or transceiver is stationary at a selected location in said facility.

101. The system of claim 71 further comprising a means for defining a direction of travel of a mobile receiver or transceiver.

102. The system of claim 71 further comprising a means for defining a starting point and an ending point for a mobile receiver or transceiver.

103. The system of claim 71 further comprising means for joining separate floor measurements collected within said facility.

104. The system of claim 71 wherein said site specific drawing database provides a three dimensional representation of said facility with embedded measurements obtained from said means for embedding.

105. A system modeling signal or network properties, comprising:

a site specific drawing database of a facility, said site specific drawing database providing a computerized three dimensional representation of a facility which includes at least a portion of one building; and means for embedding measurements of signal or network properties into said site specific drawing database by inputting measurements of signal or network properties obtained from one or more locations in said facility wherein each of said measurements being inputted is associated with location information corresponding to a location of said one or more locations where said measurements of said signal or network properties were made within said facility.

106. The system of claim 105 further comprising:

a receiver or transceiver for making one or more measurements;

measurement location determining device or location determining system for determining a location of each measurement; and means for either or both storing or communicating to said site specific drawing database said one or more measurements and said location of each measurement.

107. The system of claim 106 wherein said receiver or transceiver makes measurements at a time or distance interval.

108. The system of claim 106 wherein said receiver or transceiver is equipped with a means for making measurements selectively after said receiver or transceiver has been located at a desired location within said facility.

109. The system of claim 105 wherein said means for embedding operates on an automated basis.

110. The system of claim 105 further comprising means for displaying said site specific drawing database of said facility with embedded measured signal or network properties.

111. The system of claim 105 further comprising a location tracking mechanism or positioning device.

112. The system of claim 105 wherein said site specific drawing database includes site specific information.

113. The system of claim 112 wherein said site specific information is selected from the group consisting of building materials, building configuration, transceiver locations, measurement locations, modeled signal properties, modeled network properties, partition types, measured signal properties, and measured network properties.

114. The system of claim 105 further comprising means for forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

115. The system of claim 114 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

116. The system of claim 105 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

117. The system of claim 105 further comprising a means for manipulating or modifying one or more drawings in said site specific drawing database.

118. The system of claim 117 wherein said means for manipulating or modifying allows altering site specific content of said one or more drawings.

119. The system of claim 118 said site specific content is selected from the group consisting of building materials, building configuration, transceiver locations, measurement locations, modeled signal properties, modeled network properties, partition types, measured signal properties, and measured network properties.

120. The system of claim 105 wherein said site specific drawing database represents a three dimensional position by specifying a point in space using an x, y coordinate pair and a height value above a floor or ground within a facility.

121. The system of claim 105 wherein said site specific drawing database represents a two-dimensional location as a point on a top-plan view of a floor plan of said facility.

122. The system of claim 105 wherein said site specific drawing database identifies a transmitter, receiver or transceiver location within said facility.

123. The system of claim 122 wherein an identified transmitter, receiver or transceiver location within said site specific drawing database of said facility is altered by movement of said transmitter, receiver or transceiver.

124. The system of claim 105 wherein said site specific drawing database includes at least one floor plan of one or more floors of one or more buildings in said facility.

125. The system of claim 105 wherein said site specific drawing database includes a plurality of floor plans of one or more floors of one or more buildings in said facility.

126. The system of claim 105 further comprising means for verifying performance of communication or data networks.

127. The system of claim 105 further comprising means for averaging measured signal measurements over space or time.

128. The system of claim 105 wherein measured signal or network properties are embedded in said site specific drawing database using periodic distance intervals.

129. The system of claim 105 wherein measured signal or network properties are embedded in said site specific drawing database using periodic time intervals.

130. The system of claim 105 wherein said means for embedding embeds measured signal properties taken while a mobile receiver or transceiver is moving throughout said facility.

131. The system of claim 105 wherein said means for embedding embeds measured signal properties taken while a mobile receiver or transceiver is stationary at a selected location in said facility.

132. The system of claim 105 further comprising a means for defining a direction of travel of a mobile receiver or transceiver.

133. The system of claim 105 further comprising a means for defining a starting point and an ending point for a mobile receiver or transceiver.

134. The system of claim 105 further comprising means for joining separate floor measurements collected within said facility.

135. The system of claim 105 wherein said means for embedding embed measurements of signal or network properties as they are made.

136. A method for creating a site specific drawing computer database of measured signal properties within a facility, comprising at least one moveable receiver or transceiver for measuring signal properties at one or more locations within said facility, comprising the steps of:

representing said facility in said site specific drawing computer database;

determining a location of said moveable receiver or transceiver within said facility; and embedding said measured signal properties as they are made at said location within said site specific drawing computer database of said facility.

137. The method of claim 136 further comprising the step of displaying said site specific drawing computer database of said facility with said embedded signal properties.

138. The method recited in claim 137, wherein said representing and said displaying steps are performed in three dimensions.

139. The method recited in claim 136, wherein said facility is a multilevel building, and said determining includes the step of moving said moveable receiver or transceiver to a plurality of locations within said multi-level building.

140. The method recited in claim 136, wherein said facility is a plurality of multi-level buildings, and said determining step includes the step of moving said mobile transceiver to a plurality of locations within different buildings of said plurality of multi-level buildings.

141. The method recited in claim 136 wherein said determining step is performed on an automated basis.

142. The method recited in claim 136 wherein said embedding step is performed on an automated basis.

143. The method in claim 136 wherein said determining step uses a location tracking mechanism or positioning device.

144. The method of claim 136 wherein said site specific drawing computer database includes site specific information.

145. The method of claim 144 wherein said site specific information is selected from the group consisting of building materials, building configuration, transceiver locations, measurement locations, modeled signal properties, modeled network properties, partition types, measured signal properties, and measured network properties.

146. The method of claim 144 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

147. The method of claim 146 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

148. The method of claim 136 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

149. The method of claim 136 further comprising the step of manipulating or modifying one or more drawings in said site specific drawing computer database.

150. The method of claim 149 wherein said step of manipulating or modifying allows altering site specific content of said one or more drawings.

151. The method of claim 150 wherein said site specific content is selected from the group consisting of building materials, building configuration, transceiver locations, measurement locations, modeled signal properties, modeled network properties, partition types, measured signal properties, and measured network properties.

152. The method of claim 136 wherein said site specific drawing computer database represents a three dimensional position location by specifying a point in space using an x, y coordinate pair and a height value above a floor or ground within a facility.

153. The method of claim 136 wherein said site specific drawing computer database represents a two-dimensional location as a point on a top-plan view of a floor plan of said facility.

154. The method of claim 136 further comprising the step of identifying a transmitter, receiver or transceiver location within said facility.

155. The method of claim 154 wherein an identified transmitter, receiver or transceiver location within said site specific drawing computer database of said facility is altered by movement of said transmitter, receiver or transceiver.

156. The method of claim 136 wherein said site specific drawing computer database includes at least one floor plan of one or more floors of one or more buildings in said facility.

157. The method of claim 136 wherein said site specific drawing computer database includes a plurality of floor plans of one or more floors of one or more buildings in said facility.

158. The method of claim 136 further comprising the step of verifying performance of communication or data networks.

159. The method of claim 136 further comprising the step of averaging measured signal measurements over space or time.

160. The method of claim 136 wherein measured signal properties are embedded in said site specific drawing computer database using periodic distance intervals.

161. The method of claim 136 wherein measured signal properties are embedded in said site specific drawing computer database using periodic time intervals.

162. The method of claim 136 wherein said embedding step embeds measured signal properties taken while said moveable receiver or transceiver is moving throughout said facility.

163. The method of claim 136 wherein said embedding step embeds measured signal properties taken while said moveable receiver or transceiver is stationary at a selected location in said facility.

164. The method of claim 136 further comprising the step of defining a direction of travel of said moveable receiver or transceiver.

165. The method of claim 136 further comprising the step of defining a starting point and an ending point for said moveable receiver or transceiver.

166. The method of claim 136 further comprising the step of joining separate floor measurements collected within said facility.

167. The method of claim 136 wherein said site specific drawing computer database provides a three dimensional representation of said facility with embedded measurements obtained from said embedding step.

168. The method of claim 167 wherein said embedding step includes the steps of:

measuring one or more signal or network properties;

associating location information with each measurement made in said measuring step; and loading said measurements made in said measuring step and location information obtained from said associating step into a computer which includes said site specific drawing computer database.

169. The method of claim 136 wherein said embedded signal properties obtained from said embedding step are obtained in random order.

170. The method of claim 136 wherein said measurements embedded in said embedding step are obtained from a single measurement run throughout said facility.

171. A method for creating a site specific drawing computer database for recorded network properties within a facility, comprising a mobile client computer that is moveable within a facility, and a server or other mobile client computer for hosting said moveable client computer, comprising the steps of:

recording network properties at one or more locations within said facility between said moveable client computer and said server computer or other mobile client computer;

representing said facility in a database model; and embedding said recorded network properties at one or more locations within said database model of said facility.

172. The method of claim 171 further comprising the step of displaying said site specific drawing computer database of said facility with said embedded network properties.

173. The method of claim 172 wherein said representing and displaying steps are performed in three dimensions.

174. The method of claim 171, wherein said recording step records network properties as a function of time or location within said facility.

175. The method of claim 171 wherein said recording step includes the step of moving said mobile client computer to different locations within said facility.

176. A method of claim 171 wherein said facility comprises a plurality of buildings, each with one or more levels, and said recording step includes the step of moving said mobile client computer to different levels or different buildings within said plurality of buildings.

177. The method of claim 171 further comprising the step of periodically determining a location of said mobile client computer within said facility.

178. The method of claim 171 further comprising the step of moving said server computer within said facility.

179. The method of claim 171, wherein said step of embedding network properties includes embedding at least one of data throughput rate, frame errors, packet retries, network data throughput, and network delay due to a fixed non-wireless portion of a network.

180. The method of claim 171 wherein said network properties are selected from the group consisting of consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

181. The method of claim 171 wherein said recording step is performed on an automated basis.

182. The method of claim 171 wherein said embedding step is performed on an automated basis.

183. The method of claim 171 further comprising the step of identifying said one or more locations within said facility on an automated basis.

184. The method in claim 171 further comprising the step of determining a location of said mobile client computer using a location tracking mechanism or positioning device.

185. The method of claim 171 wherein said site specific drawing computer database includes site specific information.

186. The method of claim 185 wherein said site specific information is selected from the group consisting of building materials, building configuration, transceiver locations, measurement locations, modeled signal properties, modeled network properties, partition types, measured signal properties, and measured network properties.

187. The method of claim 171 further comprising the step of forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

188. The method of claim 187 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

189. The method of claim 171 further comprising the step of manipulating or modifying one or more drawings in said site specific drawing computer database.

190. The method of claim 171 wherein said step of manipulating or modifying allows altering site specific content of said one or more drawings.

191. The method of claim 190 wherein said site specific content is selected from the group consisting of building materials, building configuration, transceiver locations, measurement locations, modeled signal properties, modeled network properties, partition types, measured signal properties, and measured network properties.

192. The method of claim 171 wherein said site specific drawing computer database represents a three dimensional position location by specifying a point in space using an x, y coordinate pair and a height value above a floor or ground within a facility.

193. The method of claim 171 wherein said site specific drawing computer database represents a two-dimensional location as a point on a top-plan view of a floor plan of said facility.

194. The method of claim 171 further comprising the step of identifying a transmitter, receiver or transceiver location within said facility.

195. The method of claim 194 wherein an identified transmitter, receiver or transceiver location within said site specific drawing computer database of said facility is altered by movement of said transmitter, receiver or transceiver.

196. The method of claim 171 wherein said site specific drawing computer database includes at least one floor plan of one or more floors of one or more buildings in said facility.

197. The method of claim 171 wherein said site specific drawing computer database includes a plurality of floor plans of one or more floors of one or more buildings in said facility.

198. The method of claim 171 further comprising the step of verifying performance of communication or data networks.

199. The method of claim 171 further comprising the step of averaging measured network properties over space or time.

200. The method of claim 171 wherein measured network properties are embedded in said site specific drawing computer database using periodic distance intervals.

201. The method of claim 171 wherein measured network properties are embedded in said site specific drawing computer database using periodic time intervals.

202. The method of claim 171 wherein said embedding step embeds measured network properties taken while said mobile client computer is moving throughout said facility.

203. The method of claim 171 wherein said embedding step embeds measured network properties taken while said mobile client computer is stationary at a selected location in said facility.

204. The method of claim 171 further comprising the step of defining a direction of travel of said mobile client computer.

205. The method of claim 171 further comprising the step of defining a starting point and an ending point for said mobile client computer.

206. The method of claim 171 further comprising the step of joining separate floor measurements collected within said facility.

207. The method of claim 171 wherein said site specific drawing computer database provides a three dimensional representation of said facility with embedded measurements obtained from said embedding step.

208. The method of claim 207 wherein said embedding step includes the steps of:

measuring one or more network properties;

associating location information with each measurement made in said measuring step; and loading said measurements made in said measuring step and location information obtained from said associating step into a computer which includes said site specific computer database.

209. The method of claim 171 wherein said embedded signal properties obtained from said embedding step are obtained in random order.

210. The method of claim 171 wherein said server computer or other mobile computer is not located on the premises of the facility.

211. The method of claim 171 wherein said server computer or other mobile computer is located on the premises of the facility.

212. A method for creating a site specific drawing database of signal or network properties of a facility, comprising the steps of:

providing a computerized representation of a facility which includes at least a portion of one building, said computerized representation being constructed from a site specific drawing database of said facility; and embedding measurement of signal or network properties as they are made into said site specific drawing database by inputting measurements of said signal or network properties obtained from one or more locations in said facility wherein each of said measurements being inputted is associated with location information corresponding to a location of said one or more locations where said measurements of said signal or network properties were made within said facility.

213. The method of claim 212 wherein said embedding step is performed using a receiver or transceiver for making one or more measurements and a measurement location determining device or location determining system for determining a location of each measurement, and a means for either or both storing or communicating to said site specific drawing database said one or more measurements and said location of each measurement.

214. The method of claim 213 wherein measurements are made selectively with said receiver or transceiver after said receiver or transceiver has been located at a desired location within said facility.

215. The method of claim 213 wherein measurements are made with said receiver or transceiver at a distance interval, each measurement being associated with said location information for said receiver or transceiver at said distance interval.

216. The method of claim 213 wherein said embedding step includes the step of moving said receiver or transceiver to different locations within said facility.

217. The method of claim 216 wherein measurements are made with said receiver or transceiver at a timed interval, each measurement being associated with said location information for said receiver or transceiver at said timed interval.

218. The method of claim 212 wherein said site specific drawing database is three dimensional and wherein said embedding step includes the steps of:

measuring one or more signal or network properties;

associating location information with each measurement made in said measuring step; and loading said measurements made in said measuring step and location information obtained from said associating step into a computer which includes said site specific drawing database.

219. The method recited in claim 212 wherein measurements made during said embedding step are made on an automated basis.

220. The method recited in claim 212 wherein said one or more locations are input in said embedding step on automated basis.

221. The method recited in claim 212 further comprising the step of displaying said computerized representation of said facility with embedded signal or network property measurements.

222. The method in claim 212 wherein said embedding step uses data obtained from a location tracking mechanism or positioning device.

223. The method of claim 212 wherein said site specific drawing database includes site specific information.

224. The method of claim 223 wherein said site specific information is selected from the group consisting of building materials, building configuration, transceiver locations, measurement locations, modeled signal properties, modeled network properties, partition types, measured signal properties, and measured network properties.

225. The method of claim 212 further comprising the step of forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

226. The method of claim 225 wherein site specific models formed in said forming step model a signal or network property selected from the group consisting of microcell communications systems, local area networks, wireless local area networks, wide area networks, campus and inbuilding wireless and wired communication networks, data networks, sensor networks, ad hoc networks and wireless communication networks.

227. The method of claim 212 wherein said signal or network properties are obtained from at least one of the group consisting of microcell communications systems, local area networks, wireless local area networks, wide area networks, campus and inbuilding wireless and wired communication networks, data networks, sensor networks, ad hoc networks and wireless communication networks.

228. The method of claim 212 further comprising the step of manipulating or modifying one or more drawings in said site specific drawing database.

229. The method of claim 228 wherein said step of manipulating or modifying allows altering site specific content of said one or more drawings.

230. The method of claim 229 wherein said site specific content is selected from the group consisting of building materials, building configuration, transceiver locations, measurement locations, modeled signal properties, modeled network properties, partition types, measured signal properties, and measured network properties.

231. The method of claim 212 wherein said site specific drawing database represents a three dimensional position location by specifying a point in space using an x, y coordinate pair and a height value above a floor or ground within a facility.

232. The method of claim 212 wherein said site specific drawing database represents a two-dimensional location as a point on a top-plan view of a floor plan of said facility.

233. The method of claim 212 further comprising the step of identifying a transmitter, receiver or transceiver location within said facility.

234. The method of claim 233 wherein an identified transmitter, receiver or transceiver location within said site specific drawing database of said facility is altered by movement of said transmitter, receiver or transceiver.

235. The method of claim 212 wherein said site specific drawing database includes at least one floor plan of one or more floors of one or more buildings in said facility.

236. The method of claim 212 wherein said site specific drawing database includes a plurality of floor plans of one or more floors of one or more buildings in said facility.

237. The method of claim 212 further comprising the step of verifying performance of communication or data networks.

238. The method of claim 212 further comprising the step of averaging measured signal measurements over space or time.

239. The method of claim 212 wherein measured signal or network properties are embedded in said site specific drawing database using periodic distance intervals.

240. The method of claim 212 wherein measured signal or network properties are embedded in said site specific drawing database using periodic time intervals.

241. The method of claim 212 wherein said embedding step embeds measured signal network properties taken while a moveable receiver or transceiver is moving throughout said facility.

242. The method of claim 212 wherein said embedding step embeds measured signal or network properties taken while a moveable receiver or transceiver is stationary at a selected location in said facility.

243. The method of claim 212 further comprising the step of defining a direction of travel of a moveable receiver or transceiver.

244. The method of claim 212 further comprising the step of defining a starting point and an ending point for a moveable receiver or transceiver.

245. The method of claim 244 wherein said embedding step includes the steps of:

measuring one or more signal or network properties;

associating location information with each measurement made in said measuring step; and loading said measurements made in said measuring step and location information obtained from said associating step into a computer which includes said site specific drawing database.

246. The method of claim 212 wherein said embedded signal or network properties obtained from said embedding step are obtained in random order.

247. The method of claim 212 wherein said measurements embedded in said embedding step are obtained from a single measurement run throughout said facility.

248. The method of claim 212 wherein said measurements embedded in said embedding step are obtained from a plurality of measurement runs throughout said facility.

249. The method of claim 212 wherein said signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

250. The method of claim 212 further comprising the step of joining separate floor measurements collected within said facility.

251. The method of claim 212 wherein said site specific drawing database provides a three dimensional representation of said facility with embedded measurements obtained from said embedding step.

252. A method for modeling signal or network properties, comprising the steps of:

providing a computerized three dimensional representation of a facility which includes at least a portion of one building, said computerized three dimensional representation being constructed from a site specific drawing database of said facility; and embedding measurements of signal or network properties into said site specific drawing database by inputting measurements of said signal or network properties obtained from one or more locations in said facility wherein each of said measurements being inputted is associated with location information corresponding to a location of said one or more locations where said measurements of said signal or network properties were made within said facility.

253. The method of claim 252 wherein said embedding step is performed using a receiver or transceiver for making one or more measurements and a measurement location determining device or location determining system for determining a location of each measurement, and a means for either or both storing or communicating to said site specific drawing database said one or more measurements and said location of each measurement.

254. The method of claim 253 wherein said embedding step includes the step of moving said receiver or transceiver to different locations within said facility.

255. The method of claim 253 wherein measurements are made with said receiver or transceiver at a timed interval, each measurement being associated with said location information for said receiver or transceiver at said timed interval.

256. The method of claim 253 wherein measurements are made with said receiver or transceiver at a distance interval, each measurement being associated with said location information for said receiver or transceiver at said distance interval.

257. The method of claim 253 wherein measurements are made selectively with said receiver or transceiver after said receiver or transceiver has been located at a desired location within said facility.

258. The method of claim 252 wherein said embedding step includes the steps of:

measuring one or more signal or network properties;

associating location information with each measurement made in said measuring step; and loading said measurements made in said measuring step and location information obtained from said associating step into a computer which includes said site specific drawing database.

259. The method recited in claim 252 wherein measurements made during said embedding step are made on an automated basis.

260. The method in claim 252 wherein embedding step uses data obtained from a location tracking mechanism or positioning device.

261. The method recited in claim 252 wherein said one or more locations input in said embedding step are input on an automated basis.

262. The method of claim 252 wherein said site specific drawing database includes site specific information.

263. The method of claim 252 wherein said site specific information is selected from the group consisting of building materials, building configuration, transceiver locations, measurement locations, modeled signal properties, modeled network properties, partition types, measured signal properties, and measured network properties.

264. The method of claim 252 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

265. The method of claim 264 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

266. The method of claim 252 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

267. The method of claim 252 further comprising the step of manipulating or modifying one or more drawings in said site specific drawing database.

268. The method of claim 267 wherein said step of manipulating or modifying allows altering site specific content of said one or more drawings.

269. The method of claim 268 wherein said site specific content is selected from the group consisting of building materials, building configuration, transceiver locations, measurement locations, modeled signal properties, modeled network properties, partition types, measured signal properties, and measured network properties.

270. The method of claim 252 wherein said site specific drawing database represents a three dimensional position location by specifying a point in space using an x, y coordinate pair and a height value above a floor or ground within a facility.

271. The method of claim 252 wherein said site specific drawing database represents a two-dimensional location as a point on a top-plan view of a floor plan of said facility.

272. The method of claim 252 further comprising the step of identifying a transmitter, receiver or transceiver location within said facility.

273. The method of claim 272 wherein an identified transmitter, receiver or transceiver location within said site specific drawing database of said facility is altered by movement of said transmitter, receiver or transceiver.

274. The method of claim 252 wherein said site specific drawing database includes at least one floor plan of one or more floors of one or more buildings in said facility.

275. The method of claim 252 wherein said site specific drawing database includes a plurality of floor plans of one or more floors of one or more buildings in said facility.

276. The method of claim 252 further comprising the step of verifying performance of communication or data networks.

277. The method of claim 252 further comprising the step of averaging measured signal measurements over space or time.

278. The method of claim 252 wherein measured signal or network properties are embedded in said site specific drawing database using periodic distance intervals.

279. The method of claim 252 wherein measured signal or network properties are embedded in said site specific drawing database using periodic time intervals.

280. The method of claim 252 wherein said embedding step embeds measured signal network properties taken while a moveable receiver or transceiver is moving throughout said facility.

281. The method of claim 252 wherein said embedding step embeds measured signal or network properties taken while a moveable receiver or transceiver is stationary at a selected location in said facility.

282. The method of claim 252 further comprising the step of defining a direction of travel of a moveable receiver or transceiver.

283. The method of claim 252 further comprising the step of defining a starting point and an ending point for a moveable receiver or transceiver.

284. The method of claim 252 further comprising the step of joining separate floor measurements collected within said facility.

285. The method of claim 252 wherein said embedded signal or network properties obtained from said embedding step are obtained in random order.

286. The method of claim 252 wherein said measurements embedded in said embedding step are obtained from a single measurement run throughout said facility.

287. The method of claim 252 wherein said measurements embedded in said embedding step are obtained from a plurality of measurement runs throughout said facility.

288. The method of claim 252 wherein said measurements embedded in said embedding step are embedded as the measurements are made.

289. A method for creating a site specific drawing computer database of measured RF signal properties within a facility, comprising at least one moveable receiver or transceiver for measuring the properties of RF signals at one or a plurality of locations within said facility, comprising the steps of:

representing said facility in said site specific drawing computer database;

determining a location of said moveable receiver or transceiver within said facility;

embedding measured RF signal properties at said location within said site specific drawing computer database of said facility, said embedding step producing embedded signal properties; and displaying said site specific drawing computer database of said facility overlayed with said embedded signal properties.

290. The method recited in claim 289 wherein said facility is a building, and said determining step includes the step of moving said moveable receiver or transceiver to a plurality of locations within said building.

291. The method recited in claim 289 wherein said facility comprises a plurality of buildings, and said determining step comprises the step of moving said moveable receiver or transceiver to a plurality of locations within different buildings of said plurality of buildings.

292. The method recited in claim 289 wherein said representing and said displaying steps are performed in two dimensions.

293. The method recited in claim 289 wherein said determining step is performed automatically.

294. The method of claim 289 wherein said representing and said displaying steps are performed in three dimensions.

295. The method recited in claim 289 wherein said embedding step is performed on an automated basis.

296. The method in claim 289 determining step uses a location tracking mechanism or positioning device.

297. The method of claim 289 wherein said site specific drawing computer database includes site specific information.

298. The method of claim 297 wherein said site specific information is selected from the group consisting of building materials, building configuration, transceiver locations, measurement locations, modeled signal properties, modeled network properties, partition types, measured signal properties, and measured network properties.

299. The method of claim 297 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

300. The method of claim 299 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

301. The method of claim 289 further comprising the step of manipulating or modifying one or more drawings in said site specific drawing computer database.

302. The method of claim 301 wherein said step of manipulating or modifying allows altering site specific content of said one or more drawings.

303. The method of claim 301 wherein said site specific content is selected from the group consisting of building materials, building configuration, transceiver locations, measurement locations, modeled signal properties, modeled network properties, partition types, measured signal properties, and measured network properties.

304. The method of claim 289 wherein said site specific drawing computer database represents a three dimensional position location by specifying a point in space using an x, y coordinate pair and a height value above a floor or ground within a facility.

305. The method of claim 289 further comprising the step of identifying a transmitter, receiver or transceiver location within said facility.

306. The method of claim 305 wherein an identified transmitter, receiver or transceiver location within said site specific drawing computer database of said facility is altered by movement of said transmitter, receiver or transceiver.

307. The method of claim 289 wherein said site specific computer database includes at least one floor plan of one or more floors of one or more buildings in said facility.

308. The method of claim 289 wherein said site specific drawing computer database includes a plurality of floor plans of one or more floors of one or more buildings in said facility.

309. The method of claim 289 further comprising the step of verifying performance of communication or data networks.

310. The method of claim 289 further comprising the step of averaging said measured RF signal properties over space or time.

311. The method of claim 289 wherein said measured RF signal properties are embedded in said site specific drawing computer database using periodic distance intervals.

312. The method of claim 289 wherein said measured RF signal properties are embedded in said site specific drawing computer database using periodic time intervals.

313. The method of claim 289 wherein said embedding step embeds said measured RF signal properties taken while said moveable receiver or transceiver is moving throughout said facility.

314. The method of claim 289 wherein said embedding step embeds said measured RF signal properties taken while said moveable receiver or transceiver is stationary at a selected location in said facility.

315. The method of claim 289 further comprising the step of defining a direction of travel of said moveable receiver or transceiver.

316. The method of claim 289 further comprising the step of defining a starting point and an ending point for said moveable receiver or transceiver.

317. The method of claim 289 further comprising the step of joining separate floor measurements collected within said facility.

318. The method of claim 289 wherein said site specific drawing computer database provides a three dimensional representation of said facility with said embedded signal properties obtained from said embedding step.

319. The method of claim 318 wherein said embedding step includes the steps of:

identifying one or more signal or network properties;

associating location information with each identification made in said identifying step; and loading said one or more signal or network properties obtained from said identifying step and location information obtained from said associating step into a computer which includes said site specific drawing computer database.

320. The method of claim 289 wherein said embedded signal properties produced in said embedding step are obtained in random order.

321. The method of claim 289 wherein embedded signal properties produced in said embedding step are obtained from a single measurement run throughout said facility.

322. The method of claim 289 wherein said RF signal properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

323. The method of claim 289 wherein said site specific drawing computer database represents a two-dimensional location as a point on a top-plan view of a floor plan of said facility.

324. A method for creating a site specific drawing computer database for recorded network data throughput properties within a facility, comprising a mobile client computer that is moveable within a facility, and a server computer or other mobile client computer for hosting said moveable client computer, comprising the steps of:

recording data throughput properties between said moveable client computer and said server computer or other mobile client computer at a plurality of locations within said facility;

representing said facility in said site specific drawing computer database;

embedding said recorded data throughput properties at each of said plurality of locations within said site specific drawing computer database of said facility; and displaying said site specific drawing computer database of said facility overlayed with said embedded data throughput properties.

325. The method of claim 324 wherein said recording step records data throughput properties as a function of time or location within said facility.

326. The method of claim 324 wherein the facility is a single building and said recording step comprises the step of moving said moveable client computer to different locations within said building.

327. The method of claim 324 wherein said facility comprises a plurality of buildings and said recording step comprises the step of moving said moveable client computer to different locations within different buildings of said plurality of buildings.

328. The method of claim 324 further comprising the step of determining a location of said moveable client computer within said facility.

329. The method of claim 328 wherein said step of determining a location is performed automatically.

330. The method of claim 324 wherein said representing and displaying steps are performed in three dimensions.

331. The method of claim 324 further comprising the step of moving said server computer or other mobile computer within said facility.

332. The method of claim 324 wherein said step of embedding data throughput properties comprises embedding at least one of data throughput rate, frame errors, packet retries, network data throughput, and network delay due to a fixed non-wireless portion of a network.

333. The method of claim 324 wherein said recording step records network properties as a function of time or location within said facility.

334. The method of claim 324 wherein said recording step includes the step of moving said mobile client computer to different locations within said facility.

335. A method of claim 324 wherein said network properties are selected from the group consisting of consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

336. The method of claim 324 wherein said recording step is performed on an automated basis.

337. The method of claim 324 wherein said embedding step is performed on an automated basis.

338. The method of claim 324 further comprising the step of identifying said one or more locations within said facility on an automated basis.

339. The method in claim 324 further comprising the step of determining a location of said moveable client computer using a location tracking mechanism or positioning device.

340. The method of claim 324 wherein said site specific drawing computer database includes site specific information.

341. The method of claim 340 wherein said site specific information is selected from the group consisting of building materials, building configuration, transceiver locations, measurement locations, modeled signal properties, modeled network properties, partition types, measured signal properties, and measured network properties.

342. The method of claim 324 further comprising the step of forming site-specific models of measured signal properties selected from the group consisting of radio signal strength intensity, network throughput, bit error rate, frame error rate, signal-to-interference ratio, signal-to-noise ratio; frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

343. The method of claim 342 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

344. The method of claim 324 further comprising the step of manipulating or modifying one or more drawings in said site specific drawing computer database.

345. The method of claim 324 wherein said step of manipulating or modifying allows altering site specific content of said one or more drawings.

346. The method of claim 345 wherein said site specific content is selected from the group consisting of building materials, building configuration, transceiver locations, measurement locations, modeled signal properties, modeled network properties, partition types, measured signal properties, and measured network properties.

347. The method of claim 345 wherein said site specific drawing computer database represents a three dimensional position location by specifying a point in space using an x, y coordinate pair and a height value above a floor or ground within a facility.

348. The method of claim 324 wherein said site specific drawing computer database represents a two-dimensional location as a point on a top-plan view of a floor plan of said facility.

349. The method of claim 324 further comprising the step of identifying a transmitter, receiver or transceiver location within said facility.

350. The method of claim 349 wherein an identified transmitter, receiver or transceiver location within said site specific drawing computer database of said facility is altered by movement of said transmitter, receiver or transceiver.

351. The method of claim 324 wherein said site specific drawing computer database includes at least one floor plan of one or more floors of one or more buildings in said facility.

352. The method of claim 324 wherein said site specific drawing computer database includes a plurality of floor plans of one or more floors of one or more buildings in said facility.

353. The method of claim 324 further comprising the step of verifying performance of communication or data networks.

354. The method of claim 324 further comprising the step of averaging measured network properties over space or time.

355. The method of claim 324 wherein measured network properties are embedded in said site specific drawing computer database using periodic distance intervals.

356. The method of claim 324 wherein measured network properties are embedded in said computer database model using periodic time intervals.

357. The method of claim 324 wherein said embedding step embeds measured network properties taken while said moveable client computer is moving throughout said facility.

358. The method of claim 324 wherein said embedding step embeds measured network properties taken while said moveable client computer is stationary at a selected location in said facility.

359. The method of claim 324 further comprising the step of defining a direction of travel of said moveable client computer.

360. The method of claim 324 further comprising the step of defining a starting point and an ending point for said moveable client computer.

361. The method of claim 324 further comprising the step of joining separate floor measurements collected within said facility.

362. The method of claim 324 wherein said site specific drawing computer database provides a three dimensional representation of said facility with embedded measurements obtained from said embedding step.

363. The method of claim 362 wherein said embedding step includes the steps of:

measuring one or more network properties;

associating location information with each measurement made in said measuring step; and loading said measurements made in said measuring step and location information obtained from said associating step into a computer which includes said site specific drawing computer database.

364. The method of claim 324 wherein said embedded signal properties obtained from said embedding step are obtained in random order.

365. The method of claim 324 wherein said server computer or other mobile computer is not located on the premises of the facility.

366. The method of claim 324 wherein said server computer or other mobile computer is located on the premises of the facility.

367. A system for measuring signal or network properties, comprising:

a site specific drawing database of a facility, said site specific drawing database providing a computerized three dimensional representation of a facility which includes at least a portion of one building; and means for embedding measurements of signal or network properties into said site specific drawing database by inputting measurements of signal or network properties obtained from one or more locations in said facility, wherein each of said measurements being inputted is associated with location information descriptive of a location of said one or more locations where said measurements of said signal or network properties were made within said facility.

368. The system of claim 367 further comprising:

a receiver or transceiver for making one or more measurements;

measurement location determining device or location determining system for determining a location of each measurement; and means for either or both storing or communicating to said site specific drawing database said one or more measurements and said location of each measurement.

369. The system of claim 368 wherein said receiver or transceiver makes measurements at a time or distance interval.

370. The system of claim 352 wherein said receiver or transceiver is equipped with a means for making measurements selectively after said receiver or transceiver has been located at a desired location within said facility.

371. The system of claim 367 wherein said means for embedding operates on an automated basis.

372. The system of claim 367 further comprising means for displaying said site specific drawing database of said facility with embedded measured signal or network properties.

373. The system of claim 367 further comprising a location tracking mechanism or positioning device.

374. The system of claim 367 wherein said site specific drawing database includes site specific information.

375. The system of claim 374 wherein said site specific information is selected from the group consisting of building materials, building configuration, transceiver locations, measurement locations, modeled signal properties, modeled network properties, partition types, measured signal properties, and measured network properties.

376. The system of claim 367 further comprising means for forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

377. The system of claim 376 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

378. The system of claim 367 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

379. The system of claim 367 further comprising a means for manipulating or modifying one or more drawings in said site specific drawing database.

380. The system of claim 379 wherein said means for manipulating or modifying allows altering site specific content of said one or more drawings.

381. The system of claim 380 said wherein site specific content is selected from the group consisting of building materials, building configuration, transceiver locations, measurement locations, modeled signal properties, modeled network properties, partition types, measured signal properties, and measured network properties.

382. The system of claim 367 wherein said site specific drawing database represents a three dimensional position by specifying a point in space using an x, y coordinate pair and a height value above a floor or ground within a facility.

383. The system of claim 367 wherein said site specific drawing database represents a two-dimensional location as a point on a top-plan view of a floor plan of said facility.

384. The system of claim 367 wherein said site specific drawing database identifies a transmitter, receiver or transceiver location within said facility.

385. The system of claim 384 wherein an identified transmitter, receiver or transceiver location within said site specific drawing database of said facility is altered by movement of said transmitter, receiver or transceiver.

386. The system of claim 367 wherein said site specific drawing database includes at least one floor plan of one or more floors of one or more buildings in said facility.

387. The system of claim 367 wherein said site specific drawing database includes a plurality of floor plans of one or more floors of one or more buildings in said facility.

388. The system of claim 367 further comprising means for verifying performance of communication or data networks.

389. The system of claim 367 further comprising means for averaging measured signal measurements over space or time.

390. The system of claim 367 wherein measured signal or network properties are embedded in said site specific drawing database using periodic distance intervals.

391. The system of claim 367 wherein measured signal or network properties are embedded in said site specific drawing database using periodic time intervals.

392. The system of claim 367 wherein said means for embedding embeds measured signal properties taken while a mobile receiver or transceiver is moving throughout said facility.

393. The system of claim 367 wherein said means for embedding embeds measured signal properties taken while a mobile receiver or transceiver is stationary at a selected location in said facility.

394. The system of claim 367 further comprising a means for defining a direction of travel of a mobile receiver or transceiver.

395. The system of claim 367 further comprising a means for defining a starting point and an ending point for a mobile receiver or transceiver.

396. The system of claim 367 further comprising means for joining separate floor measurements collected within said facility.

397. The system of claim 367 wherein said means for embedding embed measurements of signal or network properties as they are made.

398. A method for recording measurements of signal properties within a facility, comprising at least one moveable receiver or transceiver for measuring signal properties at one or more locations within said facility, comprising the steps of:

representing said facility in a site specific drawing computer database;

determining a location of said moveable receiver or transceiver within said facility; and embedding said measured signal properties as they are made at said location within said site specific drawing computer database of said facility.

399. The method of claim 398 further comprising the step of displaying said site specific drawing computer database of said facility with said embedded signal properties.

400. The method recited in claim 398 wherein said facility is a multi-level building, and said determining includes the step of moving said moveable receiver or transceiver to a plurality of locations within said multi-level building.

401. The method recited in claim 389 wherein said facility is a plurality of multi-level buildings, and said determining step includes the step of moving said moveable transceiver or receiver to a plurality of locations within different buildings of said plurality of multi-level buildings.

402. The method recited in claim 401 wherein said representing and said displaying steps are performed in three dimensions.

403. The method recited in claim 401 wherein said determining step is performed on an automated basis.

404. The method recited in claim 401 wherein said embedding step is performed on an automated basis.

405. The method in claim 401 determining step uses a location tracking mechanism or positioning device.

406. The method of claim 401 wherein said site specific drawing computer database includes site specific information.

407. The method of claim 406 wherein said site specific information is selected from the group consisting of building materials, building configuration, transceiver locations, measurement locations, modeled signal properties, modeled network properties, partition types, measured signal properties, and measured network properties.

408. The method of claim 406 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/lo, system performance parameters, equipment price, maintenance and cost information, all in either absolute or relative terms.

409. The method of claim 408 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

410. The method of claim 398 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

411. The method of claim 398 further comprising the step of manipulating or modifying one or more drawings in said site specific drawing computer database.

412. The method of claim 411 wherein said step of manipulating or modifying allows altering site specific content of said one or more drawings.

413. The method of claim 412 wherein said site specific content is selected from the group consisting of building materials, building configuration, transceiver locations, measurement locations, modeled signal properties, modeled network properties, partition types, measured signal properties, and measured network properties.

414. The method of claim 398 wherein said site specific drawing computer database represents a three dimensional position location by specifying a point in space using an x, y coordinate pair and a height value above a floor or ground within a facility.

415. The method of claim 398 wherein said site specific drawing computer database represents a two-dimensional location as a point on a top-plan view of a floor plan of said facility.

416. The method of claim 398 further comprising the step of identifying a transmitter, receiver or transceiver location within said facility.

417. The method of claim 416 wherein an identified transmitter, receiver or transceiver location within said site specific drawing computer database of said facility is altered by movement of said transmitter, receiver or transceiver.

418. The method of claim 398 wherein said site specific drawing computer database includes at least one floor plan of one or more floors of one or more buildings in said facility.

419. The method of claim 398 wherein said site specific drawing computer database includes a plurality of floor plans of one or more floors of one or more buildings in said facility.

420. The method of claim 398 further comprising the step of verifying performance of communication or data networks.

421. The method of claim 398 further comprising the step of averaging measured signal measurements over space or time.

422. The method of claim 398 wherein measured signal properties are embedded in said site specific drawing computer database using periodic distance intervals.

423. The method of claim 398 wherein measured signal properties are embedded in said site specific drawing computer database using periodic time intervals.

424. The method of claim 398 wherein said embedding step embeds measured signal properties taken while said moveable receiver or transceiver is moving throughout said facility.

425. The method of claim 398 wherein said embedding step embeds measured signal properties taken while said moveable receiver or transceiver is stationary at a selected location in said facility.

426. The method of claim 398 further comprising the step of defining a direction of travel of said moveable receiver or transceiver.

427. The method of claim 398 further comprising the step of defining a starting point and an ending point for said moveable receiver or transceiver.

428. The method of claim 398 further comprising the step of joining separate floor measurements collected within said facility.

429. The method of claim 398 wherein said site specific drawing computer database provides a three dimensional representation of said facility with embedded measurements obtained from said embedding step.

430. The method of claim 429 wherein said embedding step includes the steps of:

measuring one or more signal or network properties;

associating location information with each measurement made in said measuring step; and loading said measurements made in said measuring step and location information obtained from said associating step into a computer which includes said site specific drawing database.

431. The method of claim 398 wherein said embedded signal properties obtained from said embedding step are obtained in random order.

432. The method of claim 398 wherein said measurements embedded in said embedding step are obtained from a single measurement run throughout said facility.

433. A method for recording measurements of network properties within a facility, comprising a mobile client computer that may be moved within a facility, and a server computer or other mobile computer for hosting said moveable client computer, comprising the steps of:

recording network properties between said moveable client computer and said server computer or other mobile client computer at one or more locations within said facility;

representing said facility in a site specific drawing database; and embedding said recorded network properties at one or more locations within said site specific drawing database of said facility.

434. The method of claim 433 further comprising the step of displaying said site specific drawing database of said facility with said embedded network 435. The method of claim 433 wherein said representing and displaying steps are performed in three dimensions.

436. The method of claim 435 further comprising the step of moving said server computer within said facility.

437. The method of claim 433 wherein said recording step records network properties as a function of time or location within said facility.

438. The method of claim 433 wherein said recording step includes the step of moving said mobile client computer to different locations within said facility.

439. The method of claim 433 wherein said facility comprises a plurality of buildings, each with one or more levels, and said recording step includes the step of moving said mobile client computer to different levels or different buildings within said plurality of buildings.

440. The method of claim 433 further comprising the step of periodically determining a location of said mobile client computer within said facility.

441. The method of claim 433 wherein said step of embedding network properties includes embedding at least one of data throughput rate, frame errors, packet retries, network data throughput, and network delay due to a fixed non-wireless portion of a network.

442. The method of claim 433 wherein said network properties are selected from the group consisting of consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/lo, system performance parameters, equipment price, maintenance and cost information, all in either absolute or relative terms.

443. The method of claim 433 wherein said recording step is performed on an automated basis.

444. The method of claim 433 wherein said embedding step is performed on an automated basis.

445. The method of claim 433 further comprising the step of identifying said one or more locations within said facility on an automated basis.

446. The method in claim 433 further comprising the step of determining a location of said mobile client computer using a location tracking mechanism or positioning device.

447. The method of claim 433 wherein said site specific drawing database includes site specific information.

448. The method of claim 447 wherein said site specific information is selected from the group consisting of building materials, building configuration, transceiver locations, measurement locations, modeled signal properties, modeled network properties, partition types, measured signal properties, and measured network properties.

449. The method of claim 447 wherein said site specific content is selected from the group consisting of building materials, building configuration, transceiver locations, measurement locations, modeled signal properties, modeled network properties, partition types, measured signal properties, and measured network properties.

450. The method of claim 433 further comprising the step of forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

451. The method of claim 450 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

452. The method of claim 433 further comprising the step of manipulating or modifying one or more drawings in said site specific drawing database.

453. The method of claim 452 wherein said step of manipulating or modifying allows altering site specific content of said one or more drawings.

454. The method of claim 433 wherein said site specific drawing database represents a three dimensional position location by specifying a point in space using an x, y coordinate pair and a height value above a floor or ground within a facility.

455. The method of claim 433 wherein said site specific drawing database represents a two-dimensional location as a point on a top-plan view of a floor plan of said facility.

456. The method of claim 433 further comprising the step of identifying a transmitter, receiver or transceiver location within said facility.

457. The method of claim 456 wherein an identified transmitter, receiver or transceiver location within said site specific drawing database of said facility is altered by movement of said transmitter, receiver or transceiver.

458. The method of claim 433 wherein said site specific drawing database includes at least one floor plan of one or more floors of one or more buildings in said facility.

459. The method of claim 433 wherein said site specific drawing database includes a plurality of floor plans of one or more floors of one or more buildings in said facility.

460. The method of claim 433 further comprising the step of verifying performance of communication or data networks.

461. The method of claim 433 further comprising the step of averaging measured network properties over space or time.

462. The method of claim 433 wherein measured network properties are embedded in said site specific drawing database using periodic distance intervals.

463. The method of claim 433 wherein measured network properties are embedded in said site specific drawing database using periodic time intervals.

464. The method of claim 433 wherein said embedding step embeds measured network properties taken while said mobile client computer is moving throughout said facility.

465. The method of claim 433 wherein said embedding step embeds measured network properties taken while said mobile client computer is stationary at a selected location in said facility.

466. The method of claim 433 further comprising the step of defining a direction of travel of said mobile client computer.

467. The method of claim 433 further comprising the step of defining a starting point and an ending point for said mobile client computer.

468. The method of claim 433 further comprising the step of joining separate floor measurements collected within said facility.

469. The method of claim 433 wherein said site specific drawing database provides a three dimensional representation of said facility with embedded measurements obtained from said embedding step.

470. The method of claim 469 wherein said embedding step includes the steps of:

measuring one or more network properties;

associating location information with each measurement made in said measuring step; and loading said measurements made in said measuring step and location information obtained from said associating step into a computer which includes said site specific drawing database.

471. The method of claim 433 wherein said embedded signal properties obtained from said embedding step are obtained in random order.

472. The method of claim 433 wherein said server computer or other mobile computer is not located on the premises of the facility.

473. The method of claim 433 wherein said server computer or other mobile computer is located on the premises of the facility.

474. A method for recording measurements of signal or network properties, comprising the steps of:

providing a computerized representation of a facility which includes at least a portion of one building, said computerized representation being constructed from a site specific drawing database of said facility; and embedding measurements of signal or network properties as they are made into said site specific drawing database by inputting measurements of said signal or network properties obtained from one or more locations in said facility wherein each of said measurements being inputted is associated with location information descriptive of a location of said one or more locations where said measurements of said signal or network properties were made within said facility.

475. The method of claim 474 wherein said embedding step is performed using a receiver or transceiver for making one or more measurements and a measurement location determining device or location determining system for determining a location of each measurement, and a means for either or both storing or communicating to site specific drawing said database said one or more measurements and said location of each measurement.

476. The method of claim 475 wherein measurements are made selectively with said receiver or transceiver after said receiver or transceiver has been located at a desired location within said facility.

477. The method of claim 475 wherein measurements are made with said receiver or transceiver at a distance interval, each measurement being associated with said location information for said receiver or transceiver at said distance interval.

478. The method of claim 475 wherein said embedding step includes the step of moving said receiver or transceiver to different locations within said facility.

479. The method of claim 478 wherein measurements are made with said receiver or transceiver at a timed interval, each measurement being associated with said location information for said receiver or transceiver at said timed interval.

480. The method of claim 475 wherein said site specific drawing database is three dimensional and wherein said embedding step includes the steps of:

measuring one or more signal or network properties;

associating location information with each measurement made in said measuring step; and loading said measurements made in said measuring step and location information obtained from said associating step into a computer which includes said site specific drawing database.

481. The method recited in claim 474 wherein measurements made during said embedding step are made on an automated basis.

482. The method recited in claim 474 wherein said one or more locations are input in said embedding step on automated basis.

483. The method recited in claim 474 further comprising the step of displaying said computerized representation of said facility with embedded signal or network property measurements.

484. The method recited in claim 474 wherein embedding step uses data obtained from a location tracking mechanism or positioning device.

485. The method recited in claim 474 wherein said site specific drawing database includes site specific information.

486. The method recited in claim 474 wherein said site specific information is selected from the group consisting of building materials, building configuration, transceiver locations, measurement locations, modeled signal properties, modeled network properties, partition types, measured signal properties, and measured network properties.

487. The method recited in claim 474 further comprising the step of forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

488. The method recited in claim 487 wherein site specific models formed in said forming step model a signal or network property selected from the group consisting of microcell communications systems, local area networks, wireless local area networks, wide area networks, campus and inbuilding wireless and wired communication networks, data networks, sensor networks, ad hoc networks and wireless communication networks.

489. The method recited in claim 474 wherein said signal or network properties are selected from the group consisting of microcell communications systems, local area networks, wireless local area networks, wide area networks, campus and inbuilding wireless and wired communication networks, data networks, sensor networks, ad hoc networks and wireless communication networks.

490. The method recited in claim 474 further comprising the step of manipulating or modifying one or more drawings in said site specific drawing database.

491. The method recited in claim 490 wherein said step of manipulating or modifying allows altering site specific content of said one or more drawings.

492. The method recited in claim 491 wherein said site specific content is selected from the group consisting of building materials, building configuration, transceiver locations, measurement locations, modeled signal properties, modeled network properties, partition types, measured signal properties, and measured network properties.

493. The method recited in claim 474 wherein said site specific drawing database represents a three dimensional position location by specifying a point in space using an x, y coordinate pair and a height value above a floor or ground within a facility.

494. The method recited in claim 474 wherein said site specific drawing database represents a two-dimensional location as a point on a top-plan view of a floor plan of said facility.

495. The method recited in claim 474 further comprising the step of identifying a transmitter, receiver or transceiver location within said facility.

496. The method recited in claim 495 wherein an identified transmitter, receiver or transceiver location within said site specific drawing database of said facility is altered by movement of said transmitter, receiver or transceiver.

497. The method recited in claim 474 wherein said site specific drawing database includes at least one floor plan of one or more floors of one or more buildings in said facility.

498. The method recited in claim 474 wherein said site specific drawing database includes a plurality of floor plans of one or more floors of one or more buildings in said facility.

499. The method recited in claim 474 further comprising the step of verifying performance of communication or data networks.

500. The method recited in claim 474 further comprising the step of averaging measured signal measurements over space or time.

501. The method recited in claim 474 wherein measured signal or network properties are embedded in said site specific drawing database using periodic distance intervals.

502. The method recited in claim 474 wherein measured signal or network properties are embedded in said site specific drawing database using periodic time intervals.

503. The method recited in claim 474 wherein said embedding step embeds measured signal or network properties taken while a moveable receiver or transceiver is moving throughout said facility.

504. The method recited in claim 474 wherein said embedding step embeds measured signal or network properties taken while a moveable receiver or transceiver is stationary at a selected location in said facility.

505. The method recited in claim 474 further comprising the step of defining a direction of travel of a moveable receiver or transceiver.

506. The method recited in claim 474 further comprising the step of defining a starting point and an ending point for a moveable receiver or transceiver.

507. The method recited in claim 474 further comprising the step of joining separate floor measurements collected within said facility.

508. The method recited in claim 474 wherein said site specific drawing database provides a three dimensional representation of said facility with embedded measurements obtained from said embedding step.

509. The method recited in claim 474 wherein said embedding step includes the steps of:

measuring one or more signal or network properties;

associating location information with each measurement made in said measuring step; and loading said measurements made in said measuring step and location information obtained from said associating step into a computer which includes said site specific drawing database.

510. The method of claim 474 wherein said embedded signal or network properties obtained from said embedding step are obtained in random order.

511. The method of claim 474 wherein said measurements embedded in said embedding step are obtained from a single measurement run throughout said facility.

512. The method of claim 474 wherein said measurements embedded in said embedding step are obtained from a plurality of measurement runs throughout said facility.

513. The method of claim 474 wherein said signal or network properties are selected from the group consisting of radio strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

514. A method for recording measurements of signal or network properties, comprising the steps of:

providing a computerized three dimensional representation of a facility which includes at least a portion of one building, said computerized three dimensional representation being constructed from a site specific drawing database of said facility; and embedding measurements of signal or network properties into said site specific drawing database by inputting measurements of said signal or network properties obtained from one or more locations in said facility wherein each of said measurements being inputted is associated with location information descriptive of a location of said one or more locations where said measurements of said signal or network properties were made within said facility.

515. The method of claim 514 wherein said embedding step is performed using a receiver or transceiver for making one or more measurements and a measurement location determining device or location determining system for determining a location of each measurement, and a means for either or both storing or communicating to said site specific drawing database said one or more measurements and said location of each measurement.

516. The method of claim 515 wherein said embedding step includes the step of moving said receiver or transceiver to different locations within said facility.

517. The method of claim 515 wherein measurements are made with said receiver or transceiver at a timed interval, each measurement being associated with said location information for said receiver or transceiver at said timed interval.

518. The method of claim 515 wherein measurements are made with said receiver or transceiver at a distance interval, each measurement being associated with said location information for said receiver or transceiver at said distance interval.

519. The method of claim 515 wherein measurements are made selectively with said receiver or transceiver after said receiver or transceiver has been located at a desired location within said facility.

520. The method of claim 514 wherein said embedding step includes the steps of:

measuring one or more signal or network properties;

associating location information with each measurement made in said measuring step; and loading said measurements made in said measuring step and location information obtained from said associating step into a computer which includes said site specific drawing database.

521. The method recited in claim 514 wherein measurements inputted during said embedding step are made on an automated basis.

522. The method in claim 514 wherein embedding step uses data obtained from a location tracking mechanism or positioning device.

523. The method recited in claim 514 wherein said one or more locations input in said embedding step are input on an automated basis.

524. The method of claim 514 wherein said site specific drawing database includes site specific information.

525. The method of claim 524 wherein said site specific information is selected from the group consisting of building materials, building configuration, transceiver locations, measurement locations, modeled signal properties, modeled network properties, partition types, measured signal properties, and measured network properties.

526. The method of claim 516 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

527. The method of claim 526 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

528. The method of claim 514 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

529. The method of claim 514 further comprising the step of manipulating or modifying one or more drawings in said site specific drawing database.

530. The method of claim 529 wherein said step of manipulating or modifying allows altering site specific content of said one or more drawings.

531. The method of claim 530 wherein said site specific content is selected from the group consisting of building materials, building configuration, transceiver locations, measurement locations, modeled signal properties, modeled network properties, partition types, measured signal properties, and measured network properties.

532. The method of claim 514 wherein said site specific drawing database represents a three dimensional position location by specifying a point in space using an x, y coordinate pair and a height value above a floor or ground within a facility.

533. The method of claim 514 wherein said site specific drawing database represents a two-dimensional location as a point on a top-plan view of a floor plan of said facility.

534. The method of claim 514 further comprising the step of identifying a transmitter, receiver or transceiver location within said facility.

535. The method of claim 514 wherein an identified transmitter, receiver or transceiver location within said site specific drawing database of said facility is altered by movement of said transmitter, receiver or transceiver.

536. The method of claim 514 wherein said site specific drawing database includes at least one floor plan of one or more floors of one or more buildings in said facility.

537. The method of claim 514 wherein said site specific drawing database includes a plurality of floor plans of one or more floors of one or more buildings in said facility.

538. The method of claim 514 further comprising the step of verifying performance of communication or data networks.

539. The method of claim 514 further comprising the step of averaging measured signal measurements over space or time.

540. The method of claim 514 wherein measured signal or network properties are embedded in said site specific drawing database using periodic distance intervals.

541. The method of claim 514 wherein measured signal or network properties are embedded in said site specific drawing database using periodic time intervals.

542. The method of claim 514 wherein said embedding step embeds measured signal network properties taken while a moveable receiver or transceiver is moving throughout said facility.

543. The method of claim 514 wherein said embedding step embeds measured signal or network properties taken while a moveable receiver or transceiver is stationary at a selected location in said facility.

544. The method of claim 514 further comprising the step of defining a direction of travel of a moveable receiver or transceiver.

545. The method of claim 514 further comprising the step of defining a starting point and an ending point for a moveable receiver or transceiver.

546. The method of claim 514 further comprising the step of joining separate floor measurements collected within said facility.

547. The method of claim 514 wherein said embedded signal or network properties obtained from said embedding step are obtained in random order.

548. The method of claim 514 wherein said measurements embedded in said embedding step are obtained from a single measurement run throughout said facility.

549. The method of claim 514 wherein said measurements embedded in said embedding step are obtained from a plurality of measurement runs throughout said facility.

550. The method of claim 514 wherein said measurements embedded in said embedding step are embedded as the measurements are made.

551. A method for measuring RF signal properties within a facility, comprising at least one receiver or transceiver that is moveable for measuring the properties of RF signals at a plurality of locations within said facility, comprising the steps of:

representing said facility in a site specific drawing computer database;

periodically determining a location of said moveable receiver or transceiver within said facility;

embedding measured RF signal properties at said location within said site specific drawing computer database of said facility, said embedding step producing embedded signal properties; and displaying said site specific computer database of said facility overlayed with said embedded signal properties.

552. The method recited in claim 551 wherein said facility is a building, and said periodically determining step includes the step of moving said mobile receiver or transceiver to a plurality of locations within said building.

553. The method recited in claim 551 wherein said facility comprises a plurality of buildings, and said periodically determining step comprises the step of moving said mobile receiver or transceiver to a plurality of locations within different buildings of said plurality of buildings.

554. The method recited in claim 551 wherein said representing and said displaying steps are performed in three dimensions.

555. The method recited in claim 551 wherein said periodically determining step is performed automatically.

556. The method of claim 551 wherein said representing and said displaying steps are performed in three dimensions.

557. The method recited in claim 551 wherein said embedding step is performed on an automated basis.

558. The method in claim 551 determining step uses a location tracking mechanism or positioning device.

559. The method of claim 551 wherein said site specific drawing computer database includes site specific information.

560. The method of claim 559 wherein said site specific information is selected from the group consisting of building materials, building configuration, transceiver locations, measurement locations, modeled signal properties, modeled network properties, partition types, measured signal properties, and measured network properties.

561. The method of claim 559 further comprising the step of forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

562. The method of claim 561 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

563. The method of claim 559 wherein said site specific content is selected from the group consisting of building materials, building configuration, transceiver locations, measurement locations, modeled signal properties, modeled network properties, partition types, measured signal properties, and measured network properties.

564. The method of claim 551 further comprising the step of manipulating or modifying one or more drawings in said site specific drawing computer database.

565. The method of claim 564 wherein said step of manipulating or modifying allows altering site specific content of said one or more drawings.

566. The method of claim 551 wherein said site specific drawing computer database represents a three dimensional position location by specifying a point in space using an x, y coordinate pair and a height value above a floor or ground within a facility.

567. The method of claim 551 wherein said site specific drawing computer database represents a two-dimensional location as a point on a top-plan view of a floor plan of said facility.

568. The method of claim 551 further comprising the step of identifying a transmitter, receiver or transceiver location within said facility.

569. The method of claim 568 wherein an identified transmitter, receiver or transceiver location within said site specific drawing computer database of said facility is altered by movement of said transmitter, receiver or transceiver.

570. The method of claim 551 wherein said site specific drawing computer database includes at least one floor plan of one or more floors of one or more buildings in said facility.

571. The method of claim 551 wherein said site specific drawing computer database includes a plurality of floor plans of one or more floors of one or more buildings in said facility.

572. The method of claim 551 further comprising the step of verifying performance of communication or data networks.

573. The method of claim 551 further comprising the step of averaging said measured RF signal properties over space or time.

574. The method of claim 551 wherein said measured RF signal properties are embedded in said site specific drawing computer database using periodic distance intervals.

575. The method of claim 551 wherein said measured RF signal properties are embedded in said site specific drawing computer database using periodic time intervals.

576. The method of claim 551 wherein said embedding step embeds said measured RF signal properties taken while said moveable receiver or transceiver is moving throughout said facility.

577. The method of claim 551 wherein said embedding step embeds said measured RF signal properties taken while said moveable receiver or transceiver is stationary at a selected location in said facility.

578. The method of claim 551 further comprising the step of defining a direction of travel of said moveable receiver or transceiver.

579. The method of claim 551 further comprising the step of defining a starting point and an ending point for said moveable receiver or transceiver.

580. The method of claim 551 further comprising the step of joining separate floor measurements collected within said facility.

581. The method of claim 551 wherein said site specific drawing computer database provides a three dimensional representation of said facility with said embedded signal properties obtained from said embedding step.

582. The method of claim 581 wherein said embedding step includes the steps of:

identifying one or more signal or network properties;

associating location information with each identification made in said identifying step; and loading said one or more signal properties identified in said identifying step and location information obtained from said associating step into a computer which includes said site specific drawing computer database.

583. The method of claim 551 wherein said embedded signal properties produced in said embedding step are obtained in random order.

584. The method of claim 551 wherein said embedded signal properties produced in said embedding step are obtained from a single measurement run throughout said facility.

585. The method of claim 551 wherein said RF signal properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

586. A method for measuring network data throughput properties within a facility, comprising a mobile client computer that may be moved within a facility, and a server computer or other mobile client computer for hosting said moveable client computer, comprising the steps of:

recording data throughput properties between said moveable client computer and said server computer or other mobile client computer as the moveable client computer is positioned in one location or a plurality of locations within said facility;

representing said facility in a site specific drawing database;

embedding said recorded data throughput properties at each of said plurality of locations within said site specific drawing database of said facility; and displaying said site specific drawing database of said facility overlayed with said embedded data throughput properties.

587. The method of claim 586 wherein said recording step records data throughput properties as a function of time or location within said facility.

588. The method of claim 586 wherein the facility is a single building and said recording step comprises the step of moving said moveable client computer to different locations within said building.

589. The method of claim 586 wherein said facility comprises a plurality of buildings and said recording step comprises the step of moving said moveable client computer to different locations within different buildings of said plurality of buildings.

590. The method of claim 586 further comprising the step of periodically determining a location of said moveable client computer within said facility.

591. The method of claim 590 wherein said periodically determining step is performed automatically.

592. The method of claim 586 wherein said representing and displaying steps are performed in three dimensions.

593. The method of claim 586 further comprising the step of moving said server computer or other mobile computer within said facility.

594. The method of claim 586 wherein said step of embedding data throughput properties comprises embedding at least one of data throughput rate, frame errors, packet retries, network data throughput, and network delay due to a fixed non-wireless portion of a network.

595. The method of claim 586 wherein said recording step records network properties as a function of time or location within said facility.

596. The method of claim 586 wherein said recording step includes the step of moving said moveable client computer to different locations within said facility.

597. A method of claim 586 wherein said network properties are selected from the group consisting of consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

598. The method of claim 586 wherein said recording step is performed on an automated basis.

599. The method of claim 586 wherein said embedding step is performed on an automated basis.

600. The method of claim 586 further comprising the step of identifying said one or more locations within said facility on an automated basis.

601. The method in claim 586 further comprising the step of determining a location of said moveable client computer using a location tracking mechanism or positioning device.

602. The method of claim 586 wherein said site specific drawing database includes site specific information.

603. The method of claim 586 wherein said site specific information is selected from the group consisting of building materials, building configuration, transceiver locations, measurement locations, modeled signal properties, modeled network properties, partition types, measured signal properties, and measured network properties.

604. The method of claim 586 further comprising the step of forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

605. The method of claim 604 wherein site specific models formed in said forming step model a network selected from the group consisting of microcell communications systems, local area networks, wireless local area networks, wide area networks, campus and inbuilding wireless and wired communication networks, data networks, sensor networks, ad hoc networks and wireless communication networks.

606. The method of claim 586 further comprising the step of manipulating or modifying one or more drawings in said site specific drawing database.

607. The method of claim 586 wherein said step of manipulating or modifying allows altering site specific content of said one or more drawings.

608. The method of claim 607 wherein said site specific content is selected from the group consisting of building materials, building configuration, transceiver locations, measurement locations, modeled signal properties, modeled network properties, partition types, measured signal properties, and measured network properties.

609. The method of claim 586 wherein said site specific drawing database represents a three dimensional position location by specifying a point in space using an x, y coordinate pair and a height value above a floor or ground within a facility.

610. The method of claim 586 wherein said site specific drawing database represents a two-dimensional location as a point on a top-plan view of a floor plan of said facility.

611. The method of claim 586 further comprising the step of identifying a transmitter, receiver or transceiver location within said facility.

612. The method of claim 611 wherein an identified transmitter, receiver or transceiver location within said site specific drawing database of said facility is altered by movement of said transmitter, receiver or transceiver.

613. The method of claim 586 wherein said site specific drawing database includes at least one floor plan of one or more floors of one or more buildings in said facility.

614. The method of claim 586 wherein said site specific drawing database includes a plurality of floor plans of one or more floors of one or more buildings in said facility.

615. The method of claim 586 further comprising the step of verifying performance of communication or data networks.

616. The method of claim 586 further comprising the step of averaging measured network properties over space or time.

617. The method of claim 586 wherein measured network properties are embedded in said site specific drawing database using periodic distance intervals.

618. The method of claim 586 wherein measured network properties are embedded in said site specific drawing database using periodic time intervals.

619. The method of claim 586 wherein said embedding step embeds measured network properties taken while said moveable client computer is moving throughout said facility.

620. The method of claim 586 wherein said embedding step embeds measured network properties taken while said moveable client computer is stationary at a selected location in said facility.

621. The method of claim 586 further comprising the step of defining a direction of travel of said moveable client computer.

622. The method of claim 586 further comprising the step of defining a starting point and an ending point for said moveable client computer.

623. The method of claim 586 further comprising the step of joining separate floor measurements collected within said facility.

624. The method of claim 586 wherein said site specific drawing database provides a three dimensional representation of said facility with embedded measurements obtained from said embedding step.

625. The method of claim 624 wherein said embedding step includes the steps of:

measuring one or more network properties;

associating location information with each measurement made in said measuring step; and loading said measurements made in said measuring step and location information obtained from said associating step into a computer which includes said site specific drawing database.

626. The method of claim 586 wherein said embedded signal properties obtained from said embedding step are obtained in random order.

627. The method of claim 586 wherein said server computer or other mobile computer is not located on the premises of the facility.

628. The method of claim 586 wherein said server computer or other mobile computer is located on the premises of the facility.

629. A system for creating a site specific drawing computer database of measured signal properties within a facility, comprising:

at least one moveable transceiver or receiver for measuring signal properties at one or more locations within said facility;

means for representing said facility in a said site specific drawing computer database;

means for determining a location of said moveable transceiver or receiver within said facility; and means for embedding measured signal properties as they are made at said location within said site specific drawing computer database of said facility, said means for determining and said means for embedding being operable at said one or more locations.

630. The system of claim 629 wherein said facility is a multi-level building and said means for determining can identify a level of said moveable transceiver or receiver within said multi-level building.

631. The system claim 629 wherein said facility is a plurality of multilevel buildings and said means for determining can identify a building and a level within said building of said moveable transceiver or receiver within said plurality of multi-level buildings.

632. The system of claim 629 wherein said site specific drawing computer database of said facility is a three-dimensional model.

633. The system of claim 629 wherein said means for determining operates on an automated basis.

634. The system of claim 629 further comprising means for displaying said site specific drawing computer database of said facility with embedded measured signal properties.

635. The system of claim 629 wherein said means for determining a location is a location tracking mechanism or positioning device.

636. The system of claim 629 wherein said measured signal properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

637. The system of claim 629 wherein said site specific drawing computer database includes site specific information.

638. The system of claim 637 further comprising means for forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

639. The system of claim 638 wherein site specific models formed by said means for forming model a network selected from the group consisting of microcell communications systems, local area networks, wireless local area networks, wide area networks, campus and in-building wireless and wired communication networks, data networks, sensor networks, ad hoc networks and wireless communication networks.

640. The system of claim 629 further comprising a means for manipulating or modifying one or more drawings in said site specific drawing computer database.

641. The system of claim 640 wherein said means for manipulating or modifying allows altering site specific content of said one or more drawings.

642. The system of claim 629 wherein said site specific drawing computer database represents a three dimensional position location by specifying a point in space using an x, y coordinate pair and a height value above a floor or ground within a facility.

643. The system of claim 629 wherein said site specific drawing computer database represents a two-dimensional location as a point on a top-plan view of a floor plan of said facility.

644. The system of claim 629 wherein said site specific drawing computer database identifies a transmitter, receiver or transceiver location within said facility.

645. The system of claim 644 wherein an identified transmitter, receiver or transceiver location within said site specific drawing computer database of said facility is altered by movement of said transmitter, receiver or transceiver.

646. The system of claim 629 wherein said site specific drawing computer database includes at least one floor plan of one or more floors of one or more buildings in said facility.

647. The system of claim 629 wherein said site specific drawing computer database includes a plurality of floor plans of one or more floors of one or more buildings in said facility.

648. The system of claim 629 further comprising means for verifying performance of communication or data networks.

649. The system of claim 629 further comprising means for averaging measured signal properties over space or time.

650. The system of claim 629 wherein measured signal properties are embedded in said site specific drawing computer database using periodic distance intervals.

651. The system of claim 629 wherein measured signal properties are embedded in said site specific drawing computer database using periodic time intervals.

652. The system of claim 641 wherein said site specific content of said one or more drawings is selected from the group consisting of building materials, building configuration, transceiver locations, measurement locations, modeled signal properties, modeled network properties, partition types, measured signal properties, and measured network properties.

653. The system of claim 629 wherein said means for embedding embeds measured signal properties taken while said moveable receiver or transceiver is moving throughout said facility.

654. The system of claim 629 wherein said means for embedding embeds measured signal properties taken while said moveable receiver or transceiver is stationary at a selected location in said facility.

655. The system of claim 629 further comprising a means for defining a direction of travel of said moveable receiver or transceiver.

656. The system of claim 629 further comprising a means for defining a starting point and an ending point for said moveable receiver or transceiver.

657. The system of claim 629 further comprising means for joining separate floor measurements collected within said facility.

658. The system of claim 629 wherein said site specific drawing computer database provides a three dimensional representation of said facility with embedded measurements obtained from said means for embedding.

659. A system for creating a site specific drawing computer database for recorded network properties within a facility, comprising:

a mobile client computer that may be moved within a facility;

a server computer or other mobile client computer for hosting said moveable client computer;

means for recording at a plurality of locations within a facility the network properties between said moveable client computer and said server computer or other mobile client computer;

means for representing said facility in said site specific drawing computer database; and means for embedding said recorded network properties at each of said plurality of locations within said site specific drawing computer database model of said facility.

660. The system of claim 659 wherein said recorded network properties include recorded data as a function of time or location within said facility.

661. The system of claim 659 wherein said facility is a multi-level building, and further comprising a means for identifying a level of said multi-level building where said means for recording is located.

662. The system of claim 659 wherein said facility comprises a plurality of multi-level buildings and further comprising a means for identifying a building and a level of said plurality of multi-level buildings where said means for recording is located.

663. The system of claim 659 wherein said system includes a means for periodically determining a location of said moveable client computer within said facility.

664. The system of claim 663 wherein said means for periodically determining operates on an automated basis.

665. The system of claim 659 wherein said means for embedding operates on an automated basis.

666. The system of claim 659 wherein said site specific drawing computer database of said facility uses a three-dimensional model.

667. The system of claim 659 wherein said server computer is moveable.

668. The system of claim 659 wherein said network properties include data throughput rate, frame errors, packet retries, network data throughput, and network delay due to a fixed non-wireless portion of a network.

669. The system of claim 659 wherein said network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

670. The system of claim 659 further comprising means for displaying said site specific drawing computer database of said facility with embedded recorded network properties.

671. The system of claim 659 further comprising a location tracking mechanism or positioning device for determining a position of said moveable client computer in said facility.

672. The system of claim 659 wherein said means for embedding operates to embed said recorded network properties as they are made.

673. The system of claim 659 wherein said site specific drawing computer database includes site specific information.

674. The system of claim 673 further comprising means for forming site-specific models of network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

675. The system of claim 674 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

676. The system of claim 674 wherein said site specific information is selected from the group consisting of building materials, building configuration, transceiver locations, measurement locations, modeled signal properties, modeled network properties, partition types, measured signal properties, and measured network properties.

677. The system of claim 659 further comprising a means for manipulating or modifying one or more drawings in said site specific drawing computer database.

678. The system of claim 677 wherein said means for manipulating or modifying allows altering site specific content of said one or more drawings.

679. The system of claim 678 wherein said site specific content of said one or more drawings is selected from the group consisting of building materials, building configuration, transceiver locations, measurement locations, modeled signal properties, modeled network properties, partition types, measured signal properties, and measured network properties.

680. The system of claim 659 wherein said site specific drawing computer database represents a three dimensional position location by specifying a point in space using an x, y coordinate pair and a height value above a floor or ground within a facility.

681. The system of claim 659 wherein said site specific drawing computer database represents a two-dimensional location as a point on a top-plan view of a floor plan of said facility.

682. The system of claim 659 wherein said site specific drawing computer database identifies a transmitter, receiver or transceiver location within said facility.

683. The system of claim 682 wherein an identified transmitter, receiver or transceiver location within said site specific drawing computer database of said facility is altered by movement of said transmitter, receiver or transceiver.

684. The system of claim 659 wherein said site specific drawing computer database includes at least one floor plan of one or more floors of one or more buildings in said facility.

685. The system of claim 659 wherein said computer database model includes a plurality of floor plans of one or more floors of one or more buildings in said facility.

686. The system of claim 659 further comprising means for verifying performance of communication or data networks.

687. The system of claim 659 further comprising means for averaging measured network properties over space or time.

688. The system of claim 659 wherein measured network properties are embedded in said site specific drawing computer database using periodic distance intervals.

689. The system of claim 659 wherein recorded network properties are embedded in said site specific drawing computer database using periodic time intervals.

690. The system of claim 659 wherein said means for embedding embeds said network properties as they are measured.

691. The system of claim 659 wherein said means for embedding embeds network properties taken while said moveable client computer is moving throughout said facility.

692. The system of claim 659 wherein said means for embedding embeds recorded network properties taken while said moveable client computer is stationary at a selected location in said facility.

693. The system of claim 659 further comprising a means for defining a direction of travel of said moveable client computer.

694. The system of claim 659 further comprising a means for defining a starting point and an ending point for said moveable client computer.

695. The system of claim 659 further comprising means for joining separate floor measurements collected within said facility.

696. The system of claim 659 wherein said site specific drawing computer database provides a three dimensional representation of said facility with embedded measurements obtained from said means for embedding.

697. The method of claim 659 wherein said server computer or other mobile computer is not located on the premises of the facility.

698. The method of claim 659 wherein said server computer or other mobile computer is located on the premises of the facility.

699. A system for providing signal or network properties, comprising:

a site specific drawing database of a facility, said site specific drawing database providing a computerized representation of a facility which includes at least a portion of one building; and means for embedding measurements of signal or network properties, as they are made, into said database model by inputting measurements of signal or network properties obtained from one or more locations in said facility, wherein each of said measurements being inputted is associated with location information corresponding to a location of said one or more locations where said measurements of said signal or network properties were made within said facility.

700. The system of claim 699 further comprising:

a receiver or transceiver for making one or more measurements;

measurement location determining device or location determining system for determining a location of each measurement; and means for either or both storing or communicating to said site specific drawing database said one or more measurements and said location of each measurement.

701. The system of claim 700 wherein said receiver or transceiver automatically makes measurements at a timed interval.

702. The system of claim 700 wherein said receiver or transceiver is equipped with a means for making measurements selectively after said receiver or transceiver has been located at a desired location within said facility.

703. The system of claim 699 wherein said means for embedding operates on an automated basis.

704. The system of claim 699 further comprising means for displaying said site specific drawing database of said facility with embedded measured signal or network properties.

705. The system of claim 699 further comprising a location tracking mechanism or positioning device.

706. The system of claim 699 wherein said site specific drawing database includes site specific information.

707. The system of claim 706 further comprising means for forming site-specific models of measured signal or network properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

708. The system of claim 707 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

709. The system of claim 699 wherein said measured signal or network properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

710. The system of claim 706 wherein said site specific information is selected from the group consisting of building materials, building configuration, transceiver locations, measurement locations, modeled signal properties, modeled network properties, partition types, measured signal properties, and measured network properties.

711. The system of claim 699 further comprising a means for manipulating or modifying one or more drawings in said site specific drawing database.

712. The system of claim 711 wherein said means for manipulating or modifying allows altering site specific content of said one or more drawings.

713. The system of claim 711 wherein said site specific content of said one or more drawings is selected from the group consisting of building materials, building configuration, transceiver locations, measurement locations, modeled signal properties, modeled network properties, partition types, measured signal properties, and measured network properties.

714. The system of claim 699 wherein said site specific drawing database represents a three dimensional position by specifying a point in space using an x, y coordinate pair and a height value above a floor or ground within a facility.

715. The system of claim 699 wherein said site specific drawing database represents a two-dimensional location as a point on a top-plan view of a floor plan of said facility.

716. The system of claim 699 wherein said site specific drawing database identifies a transmitter, receiver or transceiver location within said facility.

717. The system of claim 716 wherein an identified transmitter, receiver or transceiver location within said database model of said facility is altered by movement of said transmitter, receiver or transceiver.

718. The system of claim 699 wherein said site specific drawing database includes at least one floor plan of one or more floors of one or more buildings in said facility.

719. The system of claim 699 wherein said site specific drawing database includes a plurality of floor plans of one or more floors of one or more buildings in said facility.

720. The system of claim 699 further comprising means for verifying performance of communication or data networks.

721. The system of claim 699 further comprising means for averaging measured signal or network properties over space or time.

722. The system of claim 699 wherein measured signal or network properties are embedded in said site specific drawing database using periodic distance intervals.

723. The system of claim 699 wherein measured signal or network properties are embedded in said site specific drawing database using periodic time intervals.

724. The system of claim 699 wherein said one or more locations are identified and embedded on an automated basis in said embedding step.

725. The system of claim 699 wherein said measurements of signal or network properties are embedded on an automated basis in said embedding step.

726. The system of claim 699 further comprising a display for displaying said computerized representation of said facility with embedded measurements of signal or network properties.

727. The system of claim 699 wherein said means for embedding embeds measured signal or network properties taken while a moveable receiver or transceiver is moving throughout said facility.

728. The system of claim 699 wherein said means for embedding embeds measured signal properties taken while a moveable receiver or transceiver is stationary at a selected location in said facility.

729. The system of claim 699 further comprising a means for defining a direction of travel of a moveable receiver or transceiver.

730. The system of claim 699 further comprising a means for defining a starting point and an ending point for a moveable receiver or transceiver.

731. The system of claim 699 further comprising means for joining separate floor measurements collected within said facility.

732. The system of claim 699 wherein said site specific drawing database provides a three dimensional representation of said facility with embedded measurements obtained from said means for embedding.

733. A system for measuring network data throughput properties within a facility, comprising:

a mobile client computer that is moveable within a facility;

a server computer or other mobile client computer for hosting said moveable client computer;

means for recording data throughput properties at a plurality of locations within said facility between said moveable client computer and said server computer or other mobile client computer;

means for representing said facility in a site specific drawing computer database;

means for embedding recorded data throughput properties at each of said plurality of locations within said site specific drawing computer database of said facility; and means for displaying said database model of said facility overlayed with said embedded data throughput properties.

734. The system of claim 733 wherein said recorded data throughput properties include recorded data as a function of time or location within said facility.

735. The system of claim 734 wherein said site specific drawing computer database includes site specific information.

736. The system of claim 735 wherein said site specific information is selected from the group consisting of building materials, building configuration, transceiver locations, measurement locations, modeled signal properties, modeled network properties, partition types, measured signal properties, and measured network properties.

737. The system of claim 735 further comprising means for forming site-specific models of network properties selected from the group consisting of radio signal strength intensity, network throughput, bit error rate, frame error rate, signal-to-interference ratios, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

738. The system of claim 737 wherein site specific models formed by said means for forming model a network selected from the group consisting of microcell communications systems, local area networks, wireless local area networks, wide area networks, campus and inbuilding wireless and wired communication networks, data networks, sensor networks, ad hoc networks and wireless communication networks.

739. The system of claim 733 wherein said facility is a multi-level building, and further comprising a means for identifying a level of said multi-level building where said means for recording is located.

740. The system of claim 733 wherein said facility comprises a plurality of multi-level buildings and further comprising a means for identifying a building and a level of said plurality of multi-level buildings where said means for recording is located.

741. The system of claim 733 wherein said system includes a means for periodically determining a location of said moveable client computer within said facility.

742. The system of claim 741 wherein said means for periodically determining operates on an automated basis.

743. The system of claim 733 wherein said means for embedding operates on an automated basis.

744. The system of claim 733 wherein said site specific drawing database of said facility uses a three-dimensional model.

745. The system of claim 733 wherein said server computer is moveable.

746. The system of claim 733 further comprising means for displaying said site specific drawing computer database of said facility with embedded recorded network properties.

747. The system of claim 733 further comprising a location tracking mechanism or positioning device for determining a position of said mobile client computer in said facility.

748. The system of claim 733 wherein said means for embedding operates to embed said recorded network properties as they are made.

749. The system of claim 733 further comprising a means for manipulating or modifying one or more drawings in said site specific drawing computer database.

750. The system of claim 749 wherein said means for manipulating or modifying allows altering site specific content of said one or more drawings.

751. The system of claim 750 wherein said site specific content of said one or more drawings is selected from the group consisting of building materials, building configuration, transceiver locations, measurement locations, modeled signal properties, modeled network properties, partition types, measured signal properties, and measured network properties.

752. The system of claim 733 wherein said site specific drawing computer database represents a three dimensional position location by specifying a point in space using an x, y coordinate pair and a height value above a floor or ground within a facility.

753. The system of claim 733 wherein said site specific drawing computer database represents a two-dimensional location as a point on a top-plan view of a floor plan of said facility.

754. The system of claim 733 wherein said site specific drawing computer database identifies a transmitter, receiver or transceiver location within said facility.

755. The system of claim 754 wherein an identified transmitter, receiver or transceiver location within said site specific drawing database of said facility is altered by movement of said transmitter, receiver or transceiver.

756. The system of claim 733 wherein said site specific drawing computer database includes at least one floor plan of one or more floors of one or more buildings in said facility.

757. The system of claim 733 wherein said site specific drawing computer database includes a plurality of floor plans of one or more floors of one or more buildings in said facility.

758. The system of claim 733 further comprising means for verifying performance of communication or data networks.

759. The system of claim 733 further comprising means for averaging measured network properties over space or time.

760. The system of claim 733 wherein measured network properties are embedded in said site specific drawing computer database using periodic distance intervals.

761. The system of claim 733 wherein recorded network properties are embedded in said site specific drawing computer database using periodic time intervals.

762. The system of claim 733 wherein said means for embedding embeds said network properties as they are measured.

763. The system of claim 733 wherein said means for embedding embeds network properties taken while said moveable client computer is moving throughout said facility.

764. The system of claim 733 wherein said means for embedding embeds recorded network properties taken while said moveable client computer is stationary at a selected location in said facility.

765. The system of claim 733 further comprising a means for defining a direction of travel of said moveable client computer.

766. The system of claim 733 further comprising a means for defining a starting point and an ending point for said moveable client computer.

767. The system of claim 733 further comprising means for joining separate floor measurements collected within said facility.

768. The system of claim 733 wherein said site specific drawing computer database provides a three dimensional representation of said facility with embedded measurements obtained from said means for embedding.

769. The system of claim 733 wherein said server computer or other mobile computer is not located on the premises of the facility.

770. The system of claim 733 wherein said network throughput properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

771. The system of claim 733 wherein said server computer or other mobile computer is located on the premises of the facility.

772. A system for measuring RF signal properties within a facility using a computer, comprising:

at least one transceiver or receiver that is moveable for measuring the properties of RF signals at one location or a plurality of locations within said facility, said at least one transceiver or receiver measuring one or more measured RF signal properties at said one location or said plurality of locations within said facility;

means for representing said facility in a site specific drawing computer database;

means for determining in an automatic manner a location of said moveable transceiver or receiver within said facility;

means for embedding said measured RF signal properties at said location within said site specific drawing computer database of said facility, said means for determining and said means for embedding being operable at each of said one location or said plurality of locations, said means for embedding producing embedded signal properties; and means for displaying said site specific drawing computer database of said facility overlayed with said embedded signal properties.

773. The system of claim 772 wherein said facility is a multi-level building and said means for determining can identify a level of said moveable transceiver or receiver within said multi-level building.

774. The system claim 772 wherein said facility is a plurality of multilevel buildings and said means for determining can identify a building and a level within said building of said moveable transceiver or receiver within said plurality of multi-level buildings.

775. The system of claim 772 wherein said site specific drawing computer database of said facility uses a three-dimensional model.

776. The system of claim 772 wherein said means for determining operates on an automated basis.

777. The system of claim 772 further comprising means for displaying said site specific drawing computer database of said facility with said embedded signal properties.

778. The system of claim 772 wherein said means for determining a location is a location tracking mechanism or positioning device.

779. The system of claim 772 wherein said site specific drawing computer database includes site specific information.

780. The system of claim 779 further comprising means for forming site-specific models of measured signal properties selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, Ec/Io, system performance parameters, equipment price, maintenance and cost information, all in either absolute or relative terms.

781. The system of claim 780 wherein site specific models formed by said means for forming model a network selected from the group consisting of microcell communications systems, local area networks, wireless local area networks, wide area networks, campus and in-building wireless and wired communication networks, data networks, sensor networks, ad hoc networks and wireless communication networks.

782. The system of claim 780 further comprising a means for manipulating or modifying one or more drawings in said site specific drawing computer database.

783. The system of claim 782 wherein said means for manipulating or modifying allows altering site specific content of said one or more drawings.

784. The system of claim 783 wherein said site specific drawing computer database represents a three dimensional position location by specifying a point in space using an x, y coordinate pair and a height value above a floor or ground within a facility.

785. The system of claim 772 wherein said site specific drawing computer database represents a two-dimensional location as a point on a top-plan view of a floor plan of said facility.

786. The system of claim 772 wherein said site specific drawing computer database identifies a transmitter, receiver or transceiver location within said facility.

787. The system of claim 786 wherein an identified transmitter, receiver or transceiver location within said database model of said facility is altered by movement of said transmitter, receiver or transceiver.

788. The system of claim 772 wherein said site specific drawing computer database includes at least one floor plan of one or more floors of one or more buildings in said facility.

789. The system of claim 772 wherein said site specific drawing computer database includes a plurality of floor plans of one or more floors of one or more buildings in said facility.

790. The system of claim 772 further comprising means for verifying performance of communication or data networks.

791. The system of claim 772 further comprising means for averaging said measured RF signal properties over space or time.

792. The system of claim 772 wherein said measured RF signal properties are embedded in said site specific drawing computer database using periodic distance intervals.

793. The system of claim 772 wherein said measured RF signal properties are embedded in said site specific drawing computer database using periodic time intervals.

794. The system of claim 793 wherein said site specific content of said one or more drawings is selected from the group consisting of building materials, building configuration, transceiver locations, measurement locations, modeled signal properties, modeled network properties, partition types, measured signal properties, and measured network properties.

795. The system of claim 772 wherein said means for embedding embeds said measured RF signal properties taken while said moveable receiver or transceiver is moving throughout said facility.

796. The system of claim 772 wherein said means for embedding embeds said measured RF signal properties taken while said moveable receiver or transceiver is stationary at a selected location in said facility.

797. The system of claim 772 further comprising a means for defining a direction of travel of said moveable receiver or transceiver.

798. The system of claim 772 further comprising a means for defining a starting point and an ending point for said moveable receiver or transceiver.

799. The system of claim 772 further comprising means for joining separate floor measurements collected within said facility.

800. The system of claim 772 wherein said site specific drawing computer database provides a three dimensional representation of said facility with said embedded signal properties obtained from said means for embedding.

801. The system of claim 772 wherein said RF signal properties are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, 802. A method for recording measurements of signal or network properties, comprising the steps of:

providing a computerized three dimensional representation of a facility which includes at least a portion of one building, said computerized three dimensional representation being constructed from a site specific drawing database of said facility; and embedding measurements of signal or network properties into said site specific drawing database by inputting measurements of said signal or network properties obtained from one or more locations in said facility wherein each of said measurements being inputted is associated with location information descriptive of a location of said one or more locations where said measurements of said signal or network properties were made within said facility, and wherein the measurements input during said embedding step are made on an automated basis.

803. A method for recording measurements of signal or network properties, comprising the steps of:

providing a computerized three dimensional representation of a facility which includes at least a portion of one building, said computerized three dimensional representation being constructed from a site specific drawing database of said facility; and embedding measurements of signal or network properties into said site specific drawing database by inputting measurements of said signal network properties obtained from one or more locations in said facility wherein each of said measurements being inputted is associated with location information descriptive of a said one or more locations where said measurements of said signal or network properties were made within said facility, and wherein the embedding step uses data obtained from a location tracking mechanism or positioning device.

* * * * *